US006529636B1

(12) United States Patent
Aono et al.

(10) Patent No.: US 6,529,636 B1
(45) Date of Patent: Mar. 4, 2003

(54) PICTURE CODING DEVICE AND PICTURE DECODING DEVICE

(75) Inventors: Tomoko Aono, Chiba (JP); Norio Ito, Chiba (JP); Hiroyuki Katata, Chiba (JP); Hiroshi Kusao, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/355,839

(22) PCT Filed: Jan. 29, 1998

(86) PCT No.: PCT/JP98/00359

§ 371 (c)(1), (2), (4) Date: Oct. 25, 1999

(87) PCT Pub. No.: WO98/35502

PCT Pub. Date: Aug. 13, 1998

(30) Foreign Application Priority Data

Feb. 5, 1997 (JP) .............................................. 9-022308

(51) Int. Cl.[7] .................................................. G06K 9/36

(52) U.S. Cl. ....................... 382/248; 382/232; 382/233; 382/240; 382/251; 375/240.11; 375/240.13; 375/240.15

(58) Field of Search ................................ 382/232, 233, 382/234, 239, 240, 243, 245, 246, 248, 251; 375/240.4, 240.15, 240.13; 341/67, 50; 348/586, 390, 415

(56) References Cited

U.S. PATENT DOCUMENTS

| | | | | |
|---|---|---|---|---|
| 5,315,670 A | | 5/1994 | Shapiro | |
| 5,412,741 A | * | 5/1995 | Shapiro | 358/1.9 |
| 5,631,644 A | | 5/1997 | Katata et al. | |
| 5,815,601 A | | 9/1998 | Katata et al. | |
| 5,856,848 A | | 1/1999 | Fujiwara et al. | |
| 5,859,668 A | | 1/1999 | Aono et al. | |
| 5,929,912 A | | 7/1999 | Aono et al. | |
| 5,963,257 A | | 10/1999 | Katata et al. | |
| 5,978,515 A | | 11/1999 | Katata et al. | |
| 5,986,708 A | | 11/1999 | Katata et al. | |
| 6,236,758 B1 | * | 5/2001 | Sodagar et al. | 375/240.19 |

FOREIGN PATENT DOCUMENTS

| | | |
|---|---|---|
| JP | 4245863 | 9/1992 |
| WO | 9716021 | 5/1997 |

OTHER PUBLICATIONS

Fujii et al.; "Topics on Wavelet Transform"; IEICE Technical Report; IE 92–11 (1992); pp. 73–77.
S. Martucci et al.; "A Zero–Tree Entropy Coding Tool for Wavelet Compression of Video"; ISO/IEC JTC/SC29/WG11; Nov. 1995; pp. 1–10.
Iraj Sodagar et al.; "Very Low Bit Rate Video Codec (Algorithm submission to MPEG4)"; ISO/IEC JTC1/SC29/WG11; Jan. 1996; pp. 1–31.
Iraj Sodagar et al.; "Results of Core Experiment T1: Wavelet Coding of I Pictures"; ISO/IEC JTC1/SC29/WG11; Nov. 1996.

* cited by examiner

*Primary Examiner*—Bhavesh Mehta
*Assistant Examiner*—Ali Bayat
(74) *Attorney, Agent, or Firm*—Birch, Stewart, Kolasch & Birch, LLP

(57) ABSTRACT

If coding is carried out on the block basis on subband coding of an image, the hierarchical characteristic which a subband image inherently has would be lost. Thus, efficient coding is to be carried out while holding the hierarchical characteristic of the subband image. After the subband image is coded on the block basis, symbol information and coefficient information are decomposed and relocated for every subband before producing coded data.

9 Claims, 26 Drawing Sheets

101 : SUBBAND DECOMPOSING PORTION
102 : BLOCK FORMING PORTION
103 : QUANTIZING PORTION
104 : SYMBOL INFORMATION DETERMINING PORTION
108 : SYMBOL INFORMATION RELOCATING PORTION
109 : COEFFICIENT RELOCATING PORTION
110 : MEMORY
111 : MEMORY
105 : SYMBOL INFORMATION CODING PORTION
106 : COEFFICIENT CODING PORTION
107 : CODED DATA INTEGRATING PORTION

101 : SUBBAND DECOMPOSING PORTION
102 : BLOCK FORMING PORTION
103 : QUANTIZING PORTION
104 : SYMBOL INFORMATION DETERMINING PORTION
108 : SYMBOL INFORMATION RELOCATING PORTION
109 : COEFFICIENT RELOCATING PORTION
110 : MEMORY
111 : MEMORY
105 : SYMBOL INFORMATION CODING PORTION
106 : COEFFICIENT CODING PORTION
107 : CODED DATA INTEGRATING PORTION

201 : CODED DATA SEPARATING PORTION
202 : SYMBOL INFORMATION DECODING PORTION
203 : COEFFICIENT DECODING PORTION
208 : MEMORY
209 : MEMORY
204 : BLOCK FORMING PORTION
205 : INVERSE QUANTIZING PORTION
206 : SUBBAND IMAGE PRODUCING PORTION
207 : SUBBAND SYNTHESIZING PORTION (a) EXAMPLE OF CODED DATA GENERATED IN THE FIRST EMBODIMENT (b) EXAMPLE OF CODED DATA GENERATED IN THE FIRST EMBODIMENT (a)

(b)

(c)

801: CODED DATA SEPARATING PORTION
802: SYMBOL INFORMATION DECODING PORTION
803: COEFFICIENT DECODING PORTION
808: MEMORY
809: MEMORY
810: DATA INTERPOLATING PORTION
804: BLOCK FORMING PORTION
805: INVERSE QUANTIZING PORTION
806: SUBBAND IMAGE PRODUCING PORTION
807: SUBBAND SYNTHESIZING PORTION

1001: SUBBAND DECOMPOSING PORTION
1002: BLOCK FORMING PORTION
1003: QUANTIZING PORTION
1004: SYMBOL INFORMATION DETERMINING PORTION
1008: SYMBOL INFORMATION RELOCATING PORTION
1009: COEFFICIENT RELOCATING PORTION
1010: MEMORY
1011: MEMORY
1005: SET FORMING PORTION
1006: SET CODING PORTION

1101: SET DECODING PORTION
1102: SET SEPARATING PORTION
1108: MEMORY
1109: MEMORY
1104: BLOCK FORMING PORTION
1105: INVERSE QUANTIZING PORTION
1106: SUBBAND IMAGE PRODUCING PORTION
1107: SUBBAND SYNTHESIZING PORTION

1401: SUBBAND DECOMPOSING PORTION
1402: BLOCK FORMING PORTION
1403: QUANTIZING PORTION
1404: SYMBOL INFORMATION DETERMINING PORTION
1405: SYMBOL INFORMATION CODING PORTION
1406: COEFFICIENT CODING PORTION
1407: DATA INTEGRATING PORTION

1501: DATA SEPARATING PORTION
1502: SYMBOL INFORMATION DECODING PORTION
1503: COEFFICIENT DECODING PORTION
1504: BLOCK DATA REPRODUCING PORTION
1505: INVERSE QUANTIZING PORTION
1506: SUBBAND IMAGE PRODUCING PORTION
1507: SUBBAND SYNTHESIZING PORTION

PICTURE CODING DEVICE AND PICTURE DECODING DEVICE

This application is the national phase under 35 U.S.C. §371 of PCT International Application No. PCT/JP98/00359 which has an International filing date of Jan. 29, 1998 which designated the United States of America.

FIELD OF THE INVENTION

The present invention relates to a digital image processing technology, and in particular to an image coding device for coding image data with a high efficiency and an image decoding device for decoding the coded data which has been coded by the image coding device.

BACKGROUND ART

Recently, subband coding techniques have been proposed as highly efficient image coding and decoding techniques. Among the subband coding techniques, a technique for decomposing an image into bands as shown in FIG. 16 in which analysis of an input image is carried out by means of a band decomposing filter bank has been generally known as a technique having a high coding efficiency. Such a technique is described by, for example, Fujii and Nomura "Topics on Wavelet Transform", technical report, IEICE, Institute of Electronics, Information and Communication Engineers, IE 92-11(1992).

FIG. 16 shows subband images which are obtained by conducting two dimensional subband decomposition for an input signal three times. A horizontal high frequency and vertical low frequency subband which is obtained by the first decomposition is designated as HL1. A horizontal low frequency and vertical high frequency subband is designated as LH1. A horizontal high frequency and vertical high frequency subband is designated as HH1. Subbands HL2, LH2 and HH2 are obtained as similarly to the foregoing by conducting second two-dimensional subband decomposition for the horizontal low frequency and vertical low frequency subband.

Subband HL3, LH3 and HH3 are obtained similarly to the foregoing by conducting third two-dimensional subband decomposition for the horizontal low frequency and vertical low frequency subband which has been obtained by second decomposition. A horizontal low frequency and vertical low frequency subband at this time is designated as LL3. The filter bank which is used for decomposing band may use a filter bank for wavelet transformation and a subband decomposing synthesizing filter bank and the like. The image which has been decomposed into subbands in such a manner has a hierarchical structure.

As a recent technique having the highest coding efficiency which is capable of adapting to the subband images, a ZTE (Zero Tree Entropy coding) technique using the above-mentioned hierarchical structure has been proposed (ISO/IEC JTC/SC29/WG11/MPEG95/N0441,ISO/IEC JTC1/SC29/WG11/MPEG96/M0637, ISO/IEC JTC1/SC29/WG11/MPEG96/M1539).

Now, the ZTE technique will be described. In the ZTE technique, a block structure which is shown in FIG. 18 is formed by collecting subband coefficients (hereinafter referred to as coefficients) corresponding to the same spacial positions which are linked with each other by arrows as shown in FIG. 17 from the image which has been decomposed in subbands. It has already known that there is a correlation between coefficients which are linked with each other by arrows in FIG. 17 excepting the highest frequency subbands.

The whole relation of the coefficients which are linked with each other by arrows in FIG. 17 is referred to as "trees". One coefficient of each of the subbands (LH3, HL3, HH3) having a frequency one level higher than that of one coefficient of the lowest frequency subband (LL3) corresponds thereto (for example, a1, a2 and a3 correspond to a0 in FIG. 17). Four coefficients of each of the subbands (LH2, HL2, HH2) having a frequency one level higher than that of each of these coefficients correspond thereto (for example, a10, a11, a12, a13 correspond to a1 in FIG. 17). Sixteen coefficients of each of the subbands (LH1, HL1, HH1) having a frequency one level higher than that of each of four coefficients correspond thereto. Trees with respect to coefficient a0 is shown in FIG. 19. White circle ○ and solid black circle ● in FIG. 19 denote coefficients in each subband. The trees in upper area comprise coefficients of the subbands having a lower resolution while the trees in lower area comprise coefficients of the subbands having a higher resolution.

In such a tree structure, the coefficients having lower resolution are referred to as "parents" and the coefficients having next higher resolution in the same spacial position as designated by arrows are referred to as "children". In FIG. 19, for example, coefficient a0 is a parent for coefficients a1, a2 and a3, which are in turn children for coefficient a0. Coefficient a1 is a parent for coefficients a10, a11, a12 and a13 and, coefficients a10, a11, a12 and a13 are children for coefficient a1.

All coefficients having higher resolution in the same spacial position which are linked with each other by arrows with respect to one parent are referred to as "descendants" and all coefficients having a lower resolution in the same spacial position which are linked with each other by arrows with respect to one child are referred to as "ancestors". In FIG. 19, for example, the coefficients encircled with a dotted line are descendants for coefficient al and coefficients a10, a1 and a0 are ancestors for coefficient a100.

Then, the coefficients are quantized in the block basis. Three symbols are assigned to each node of the trees for representing whether the quantization coefficient is zero or non-zero. Definition of the symbol will now be described. The coefficient having the lowest frequency among the coefficients in which one coefficient in a tree is zero and the coefficients of its descendants are all zero is referred to as zero-tree-root (ZTR). Since this coefficient and the coefficients having a higher resolution than that of the former coefficient are all zero at this time, it would be unnecessary to code the coefficients of its descendant if ZTR appear on a tree. When any one coefficient in a tree is not zero, but the coefficients of its descendant are all zero, the coefficient in interest is referred to as valued zero-tree root (VZTR). If there is any one non-zero coefficient in the descendant, its coefficient is referred to as "Value".

White and solid black circles denote the coefficients which the quantizing value is zero and non-zero, respectively in FIG. 19. In this case, the coefficients which require coding are shown in FIG. 20. Since a0 has a quantizing value which is not "zero" in FIG. 20, the symbol Value is assigned to code the quantizing value. Since a1 and its descendants (a10 through a13, a100 through a103 through a133) are all zero, symbol ZTR is assigned to a1 and it is not necessary to code the quantizing value. Since it can be found that the value of a1 is zero due to the fact that a1 is ZTR, it is never necessary to code the information on the descendants of a1.

Since a2 has a quantizing value which is not zero, but its descendants all have a quantizing value which is zero, symbol VZTR is assigned for coding only the quantizing value of a2. Concerning the descendants of a2, same as those of a1, it is not necessary to code their information. Since a3 has a quantizing value which is not zero and there are some descendants which have a quantizing value which is not zero, symbol Value is assigned for coding the quantizing value. VZTR is assigned for a30. ZTR is assigned for a31. Value is assigned for a32 and a33. Only the quantizing values of the coefficients having the highest frequency (a320 through a333) are coded without assigning a symbol to the coefficients. As mentioned above, the information to be coded on this block comprises:

symbol information including Value, ZTR, VZTR, Value, VZTR, ZTR, Value, Value, Value, Value, Value, . . . , Value and coefficient information including Q(a0), Q(a2), Q(a3), Q(a30), Q(a32), Q(a33), Q(a320), Q(a321), Q(a322), . . . , Q(a333), wherein Q(a) denotes the quantizing value of the coefficient a. The contents of coded data are shown in FIG. 21.

When the symbol is VZTR or Value, it is necessary to code the quantizing values of the coefficients. Since there are generally a lot of coefficients having a quantizing value which is zero in the high frequency subband, many ZTRs are generated so that it is unnecessary to code the coefficient value. Therefore high coding efficiency is achieved.

As mentioned above, in the ZTE technique the order of coding of the coefficients does not shift subband by subband, but quantization of each block is conducted, then the symbol information and the coefficient information in the block basis is completely coded and thereafter coding of next block is initiated.

An image coding device using the ZTE technique is shown in FIG. 14 and an image decoding device using the ZTE technique is shown in FIG. 15. In FIG. 14, a reference numeral 1401 denotes a subband decomposing portion for decomposing an image into subbands by means of a two-dimensional decomposing filter, 1402 denotes a block forming portion for forming a block by collecting coefficients having a parent-child relationship from the decomposed subbands as shown in FIG. 18, 1403 denotes a quantizing portion for quantizing the coefficients in the block basis, 1404 denotes a symbol information determining portion for determining the symbol which is shown in FIG. 20 in the block basis from the coefficients after the quantization, 1405 denotes a symbol information coding portion for variable-length coding each symbol information, 1406 denotes a coefficient coding portion for coding only the coefficients in which the symbol information which is determined in portion 1404 corresponds to VZTR or Value, and 1407 denotes a data integrating portion for integrating to array the symbol information before the coefficient information in one block. FIG. 22 is a flow chart showing a series of the operations.

In FIG. 15, a reference numeral 1501 denotes a data separating portion for separating coded data into symbol information and coefficient information for each one block, 1502 denotes a symbol information decoding portion for variable-length decoding symbol information, 1503 denotes a coefficient decoding portion for decoding the coefficients corresponding to Value and VZTR based upon the decoded symbol information, 1504 denotes a block data reproducing portion for reproducing all coefficient values for one block based upon the decoded symbol information and coefficient information, 1505 denotes an inverse quantizing portion for inverse quantizing the quantized coefficients for each block, 1506 denotes a subband image producing portion for producing the whole subband image by relocating the coefficient values of all blocks to deblocking them, and 1507 denotes a subband synthesizing portion for performing a subband synthesis by means of a two-dimensional synthesizing filter. FIG. 23 is a flow chart showing a series of operations.

The subband coefficients can be efficiently coded and decoded in the block basis by using the above-mentioned image coding and decoding devices.

Since a block in which subband coefficients having a parent-child relationship are collected is formed and coded in the ZTE technique in such a manner, quantization in the block basis is possible. The coding efficiency can be improved by using a fact that most of the coefficients of the high frequency are zero. On the contrary, the coded data can not be provided with the scalability which the subband coding inherently possesses.

In other words, reproduced images having different resolutions can be decoded from part of the coded data as shown in FIG. 24 in the conventional subband coding technique in which information on one subband is coded and then the information on the subband having the next higher resolution is coded. If for example, the information on only LL3 is decoded from the coded data, the whole image could be reproduced at the lowest resolution.

If LL3, HL3, LH3 and HH3 among the coded data are decoded, the whole image can be reproduced at a resolution which is higher than the case of decoding of only LL3. If all coded data is decoded, the whole image can be reproduced at the highest resolution.

However, in the ZTR technique, quantization in the block basis is possible and the coding efficiency can be improved by using the fact that most of the coefficients of the high frequency subband is zero. But if some of the coded data is decoded from the left and upper area of an image in the block basis, only part of the image can be reproduced although the regenerated part has a high resolution. In other words, the scalability which the subband inherently has is lost in the ZTE technique.

DISCLOSURE OF THE INVENTION

In order to overcome the above-mentioned problems, (1) The present invention provides an image coding device comprising means for decomposing an image into subbands to produce a first subband image; means for forming a blocked second subband image by collecting subband coefficients having a parent-child relationship between subbands in said first subband image to form a plurality of blocks; means for quantizing said subband coefficients of each block of said second subband image; means for determining symbol information representing whether the quantized subband coefficient of said second subband image is "0" or non "0"; means for relocating the symbol information of said second subband image in accordance with the frequency position in said first subband image; means for variable-length coding said relocated symbol information; means for relocating said quantized subband coefficients to be coded based upon said symbol information and forming a third subband image in accordance with the frequency position in said first subband image; means for variable-length coding said relocated subband coefficients; and means for collecting and arranging said coded symbol information and subband coefficients in each subband.

(2) The present invention comprises: means for separating said coded data into symbol information and subband coefficients; means for decoding said coded symbol information for each subband; means for reproducing said third subband image by decoding each of said subband coefficient based upon said decoded symbol information; means for forming said second blocked subband image comprising a plurality of blocks which are formed by collecting said decoded subband coefficients having a parent-child relationship in each subband; means for inverse quantizing said decoded subband coefficients of said second subband image; means for producing subband images which are relocated in accordance with the frequency position in said third subband coefficient by deblocking said inverse quantized subband coefficients of said second subband image; and means for synthesizing said subband images to provide a decoded image.

(3) There is provided means for arranging firstly all pieces of said symbol information in each subband and then arranging all said subband coefficients in each subband when said coded symbol information and subband coefficients are collected into one group for each subband.

(4) There is provided means for conducting an operation for separating the coded data which is one group comprising the symbol information and subband coefficients which are collected for each subband into all pieces of said symbol information in one subband firstly, and then into all said subband coefficient information in one subband.

(5) There is provided means for arranging sets of said symbol information and said subband coefficient corresponding thereto in accordance with the order of said symbol information in each subband, when said coded symbol information and subband coefficients are collected into one group for each subband.

(6) There is provided means for conducting an operation for separating the coded data which is one group comprising the symbol information and subband coefficients which are collected for each subband into said symbol information and said subband coefficient for each symbol for all subbands in said coded data.

(7) In lieu of said symbol information coding portion, said coefficient information coding portion and said coded data integrating portion, there are provided means for forming a set of the symbol information and subband coefficient corresponding to said symbol information, and means for variable-length coding said set of said symbol information and subband coefficient information.

(8) In lieu of said decoded data separating portion, said symbol information decoding portion and said coefficient information decoding portion, there are provided means for decoding a set of said symbol information and subband coefficient information and means for separating said decoded set into symbol information and coefficient information.

(9) There is provided means for inserting "0" into the subband coefficient value which can not be decoded if complete coded data which is produced by said image coding device can not be inputted.

BEST MODES FOR EMBODYING THE PRESENT INVENTION

Now, embodiments of an image coding device and image decoding device of the present invention will be described in detail with reference to the drawings.

Figure 1:
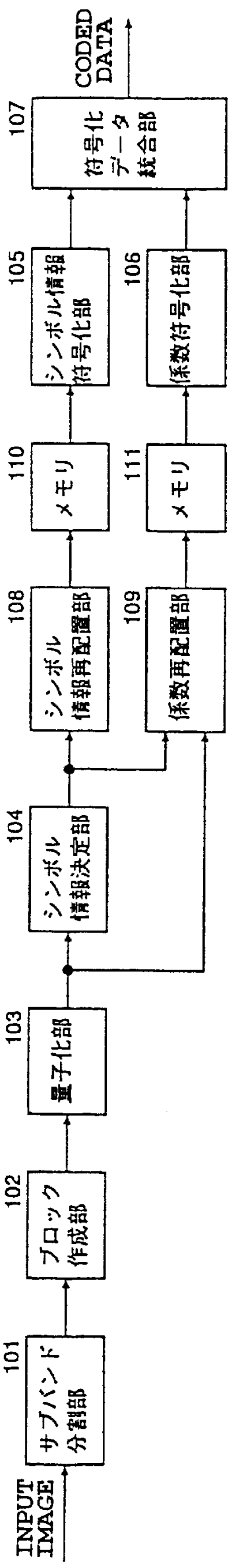
FIG. 1 is a block diagram showing an embodiment of the invention.
Figure 14:
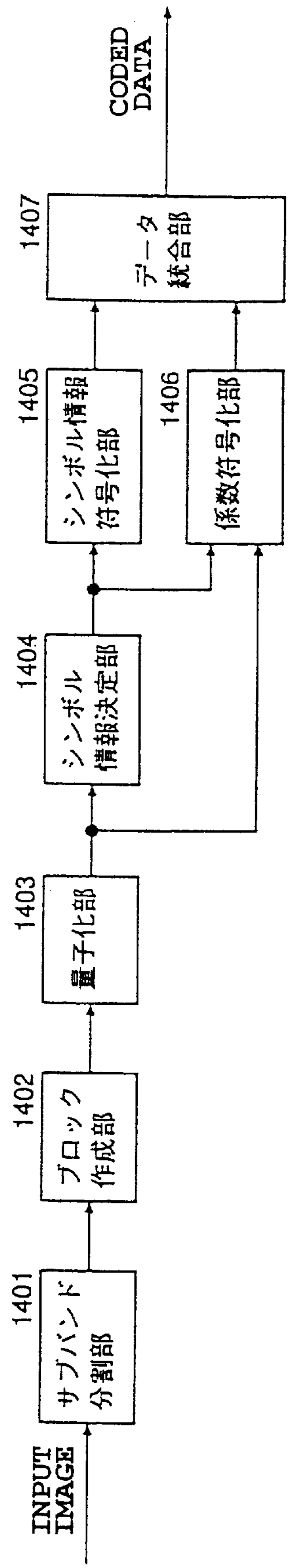
FIG. 14 is a block diagram showing the prior art.

FIG. 1 is a block diagram showing a first embodiment of the coding device of the present invention. In the drawing, a reference numeral 101 denotes a subband decomposing portion, 102 denotes a block forming portion, 103 denotes a quantizing portion, 104 denotes a symbol information determining portion, 105 denotes a symbol information coding portion, 106 denotes a coefficient coding portion. These portions 101, 102, 103, 104, 105 and 106 are identical in structure with those 1401, 1402, 1403, 1404, 1405 and 1406, respectively, which are shown in FIG. 14.

Figure 18:
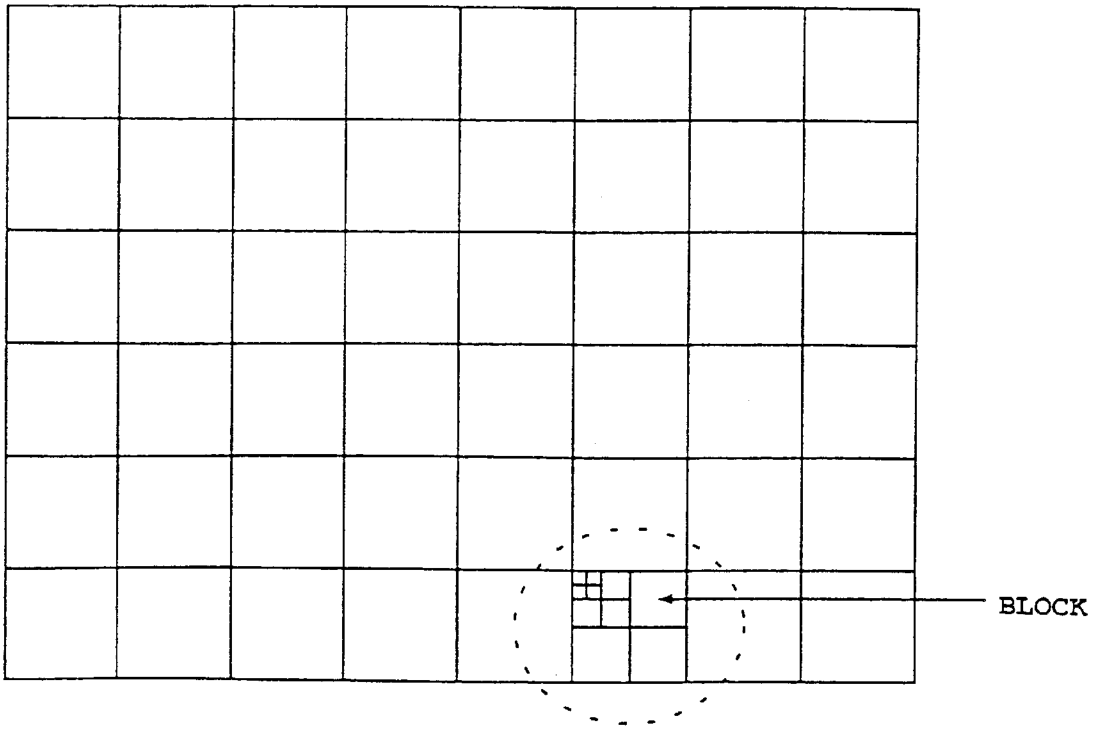
FIG. 18 is a diagram explaining the prior art.
Figure 19:
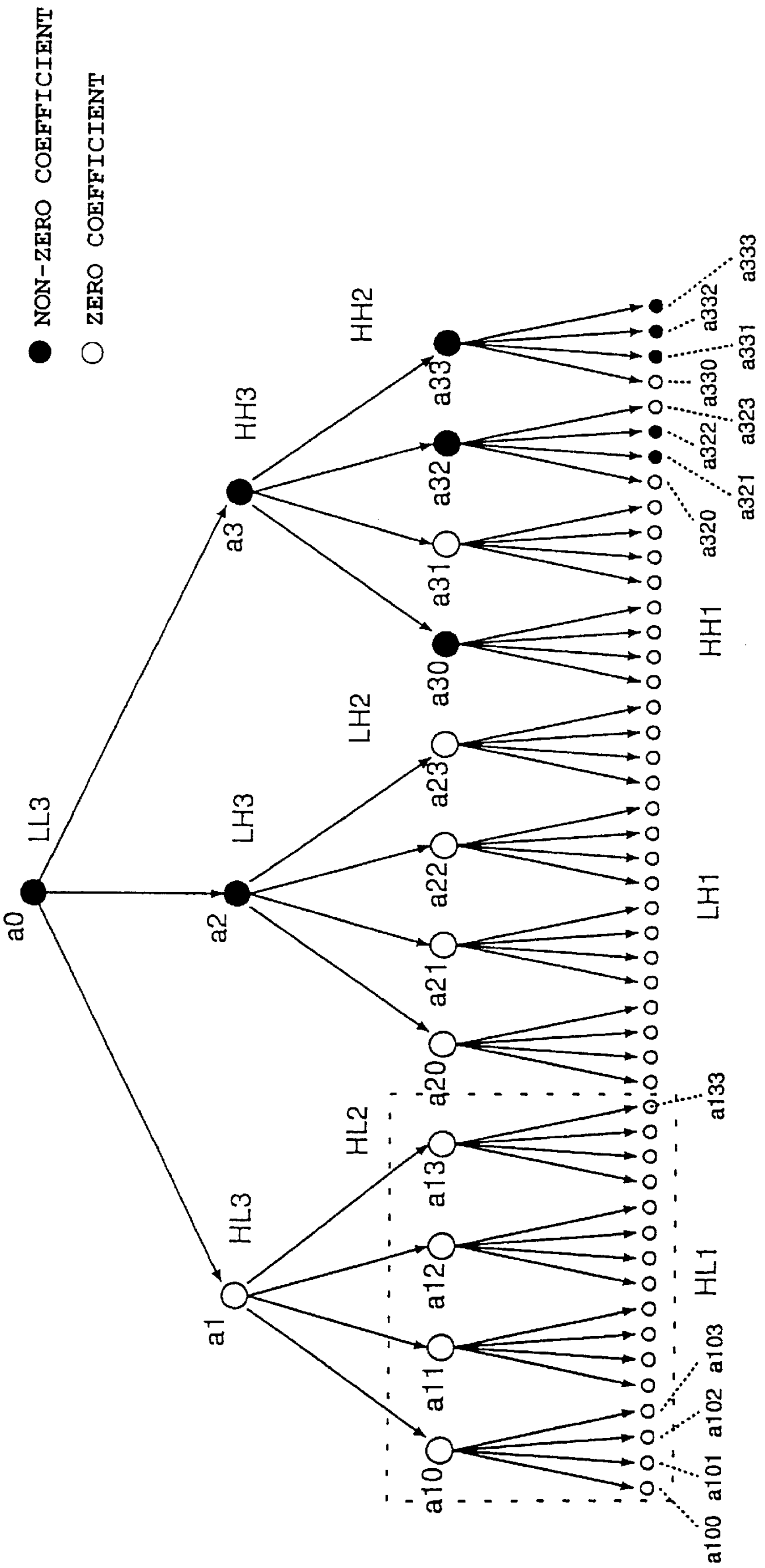
FIG. 19 is a diagram explaining the prior art.
Figure 20:
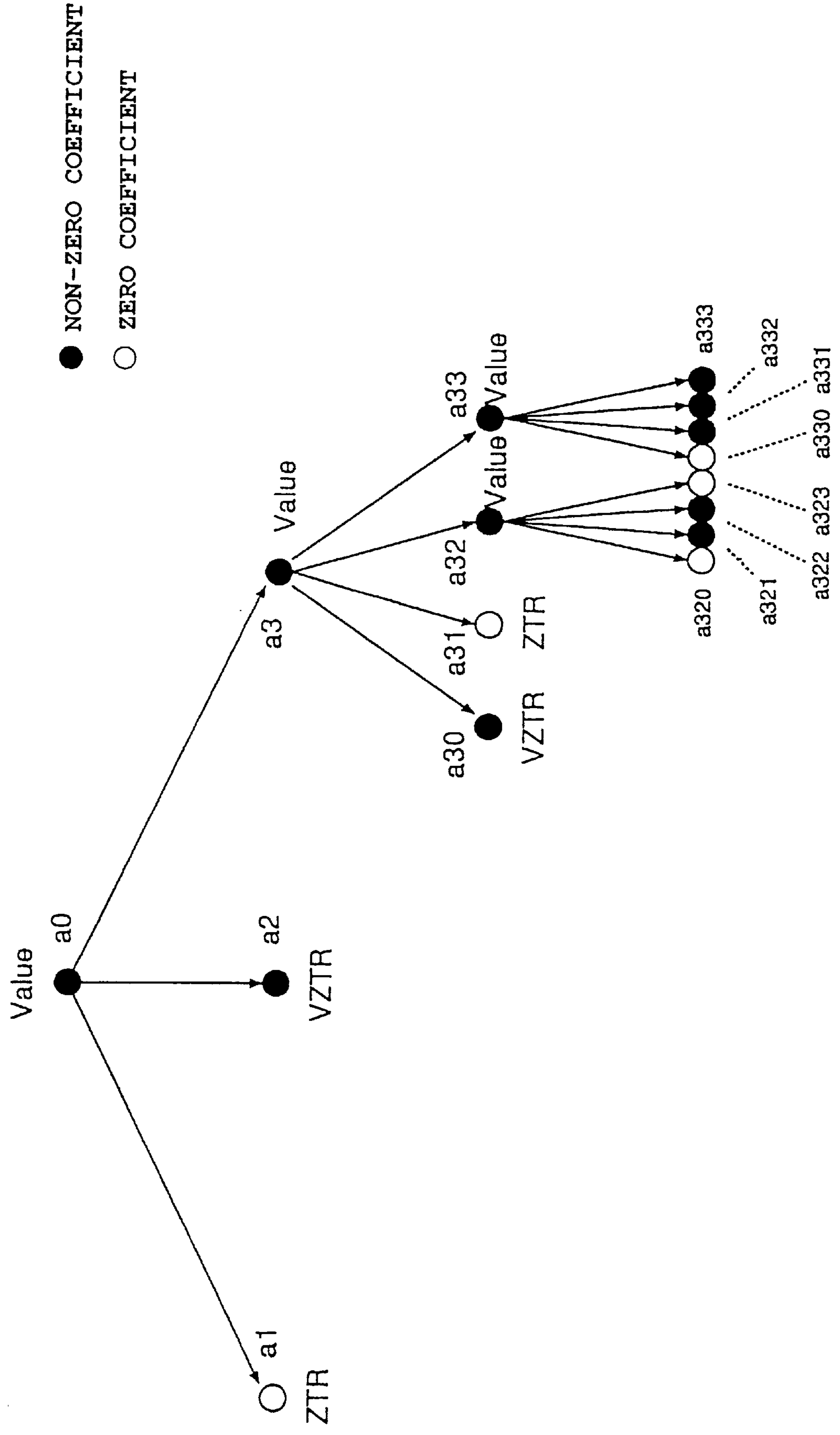
FIG. 20 is a diagram explaining the prior-art.
Figure 21:
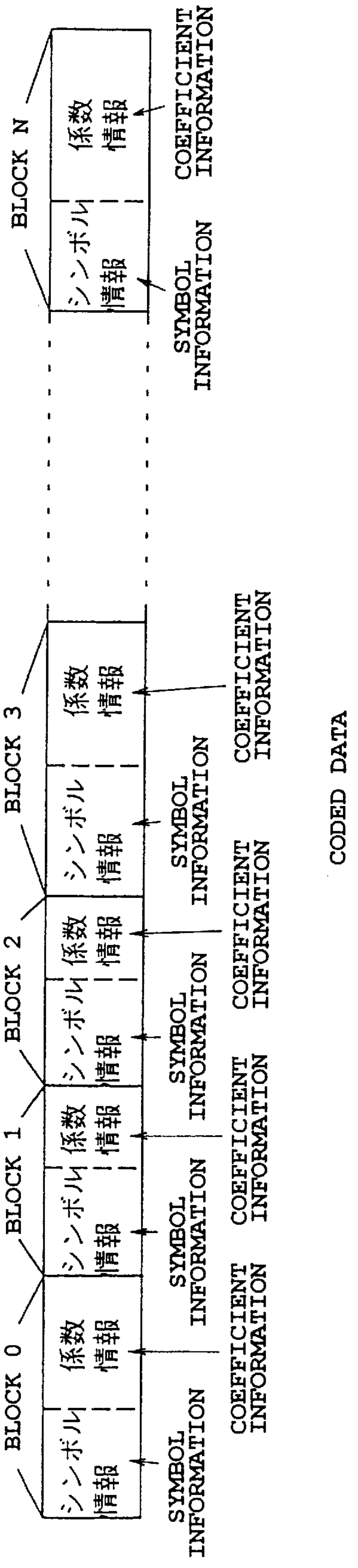
FIG. 21 is a diagram explaining the prior art.
Figure 22:
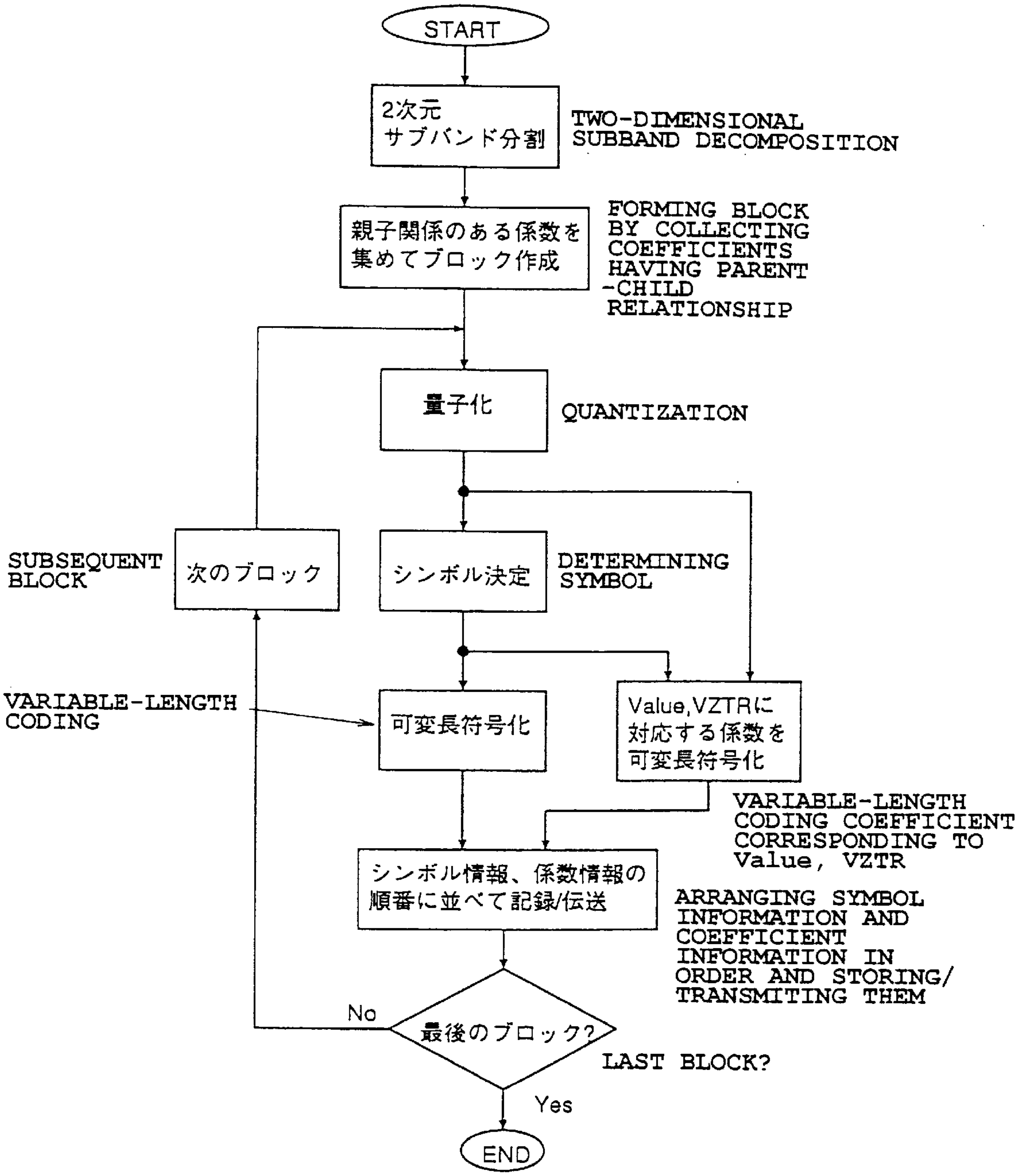
FIG. 22 is a f low chart explaining the operation of the prior art.
Figure 23:
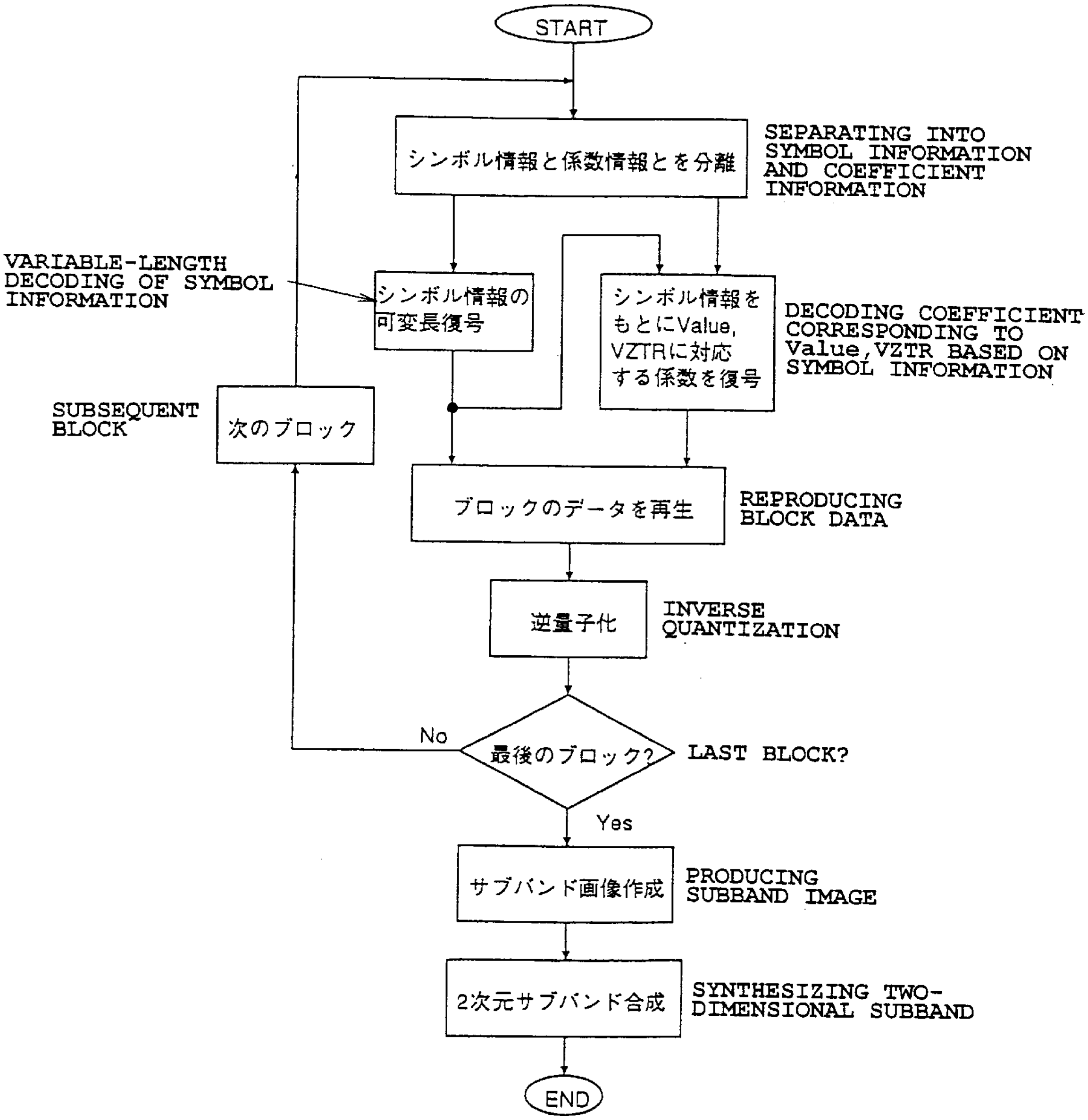
FIG. 23 is a flow chart explaining the operation of the prior art.
Figure 24:
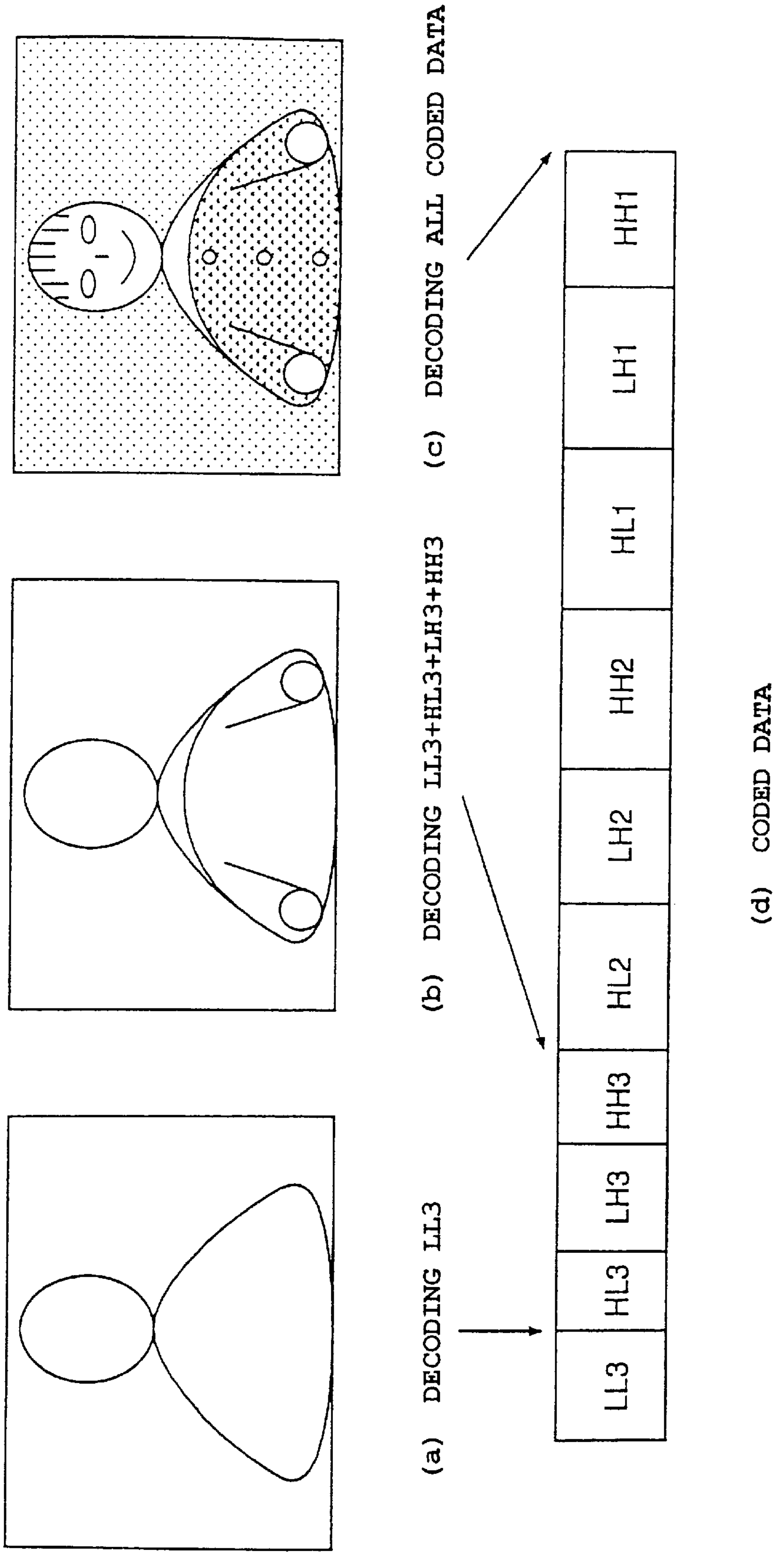
FIG. 24 is a diagram showing the scalability of the subband decomposition.
Figure 25:
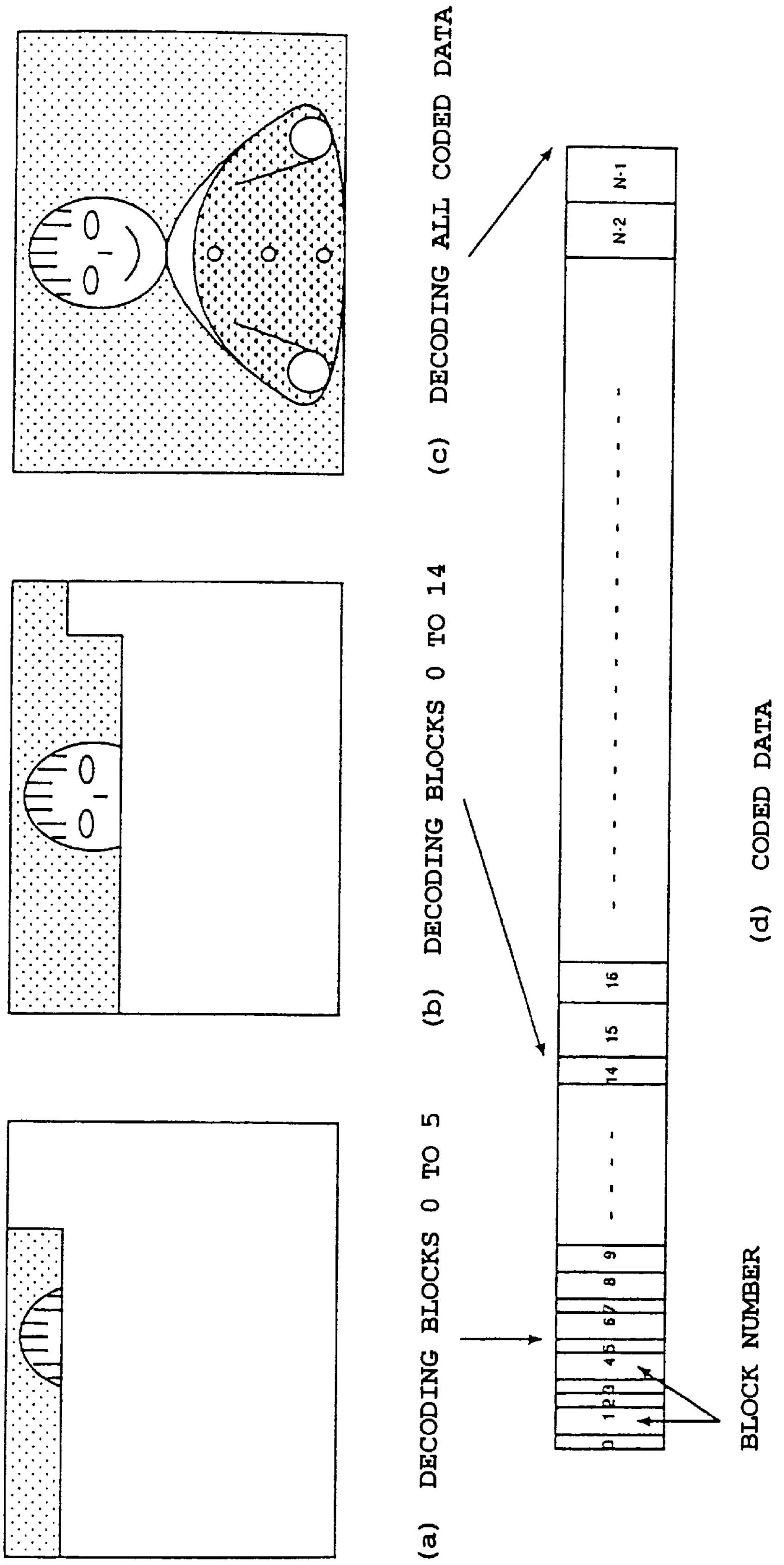
FIG. 25 is a diagram explaining the problems of the prior art.

In other words, by means of the subband decomposing portion 101, block forming portion 102, quantizing portion 103 and the symbol determining portion 104, an image is decomposed into subbands, which are divided into blocks as shown in FIG. 18. Then, the subband coefficients are quantized for each block. This operation is similar to that of the prior art. Quantization is conducted in the block basis although all blocks may be quantized in the same quantization stepsize in a special case. In the present embodiment, the symbols and the quantization coefficients in FIG. 18 which are produced by the prior art are divided and relocated in each subband so that subband images are produced again. And coding of the symbol information and coefficient information is conducted in order from the subband having a lower resolution.

A reference numeral 108 in FIG. 1 denotes the symbol information relocating portion which relocates the symbol information which is prepared for each block by the prior art for each subband. One block of the blocked subband image which is produced by the prior art in FIG. 18 corresponds to the block in a part (a) of FIG. 3. The portion 108 in FIG. 1 conducts the relocation of the symbol from the part (a) to a part (b) of FIG. 3 for each block for producing a new subband image to output it to the memory 110.

Since no symbol exists with respect to the coefficients of the descendants of ZTR and VZTR, a symbol "SKIP" is written into the memory 110 and the symbol information of SKIP is not coded when coding is conducted. The hatched areas denote SKIP in FIG. 3. As mentioned in the description of the prior art, where there is no symbol information in the subband having a highest frequency in the part (b) of FIG. 3.

Figure 4:
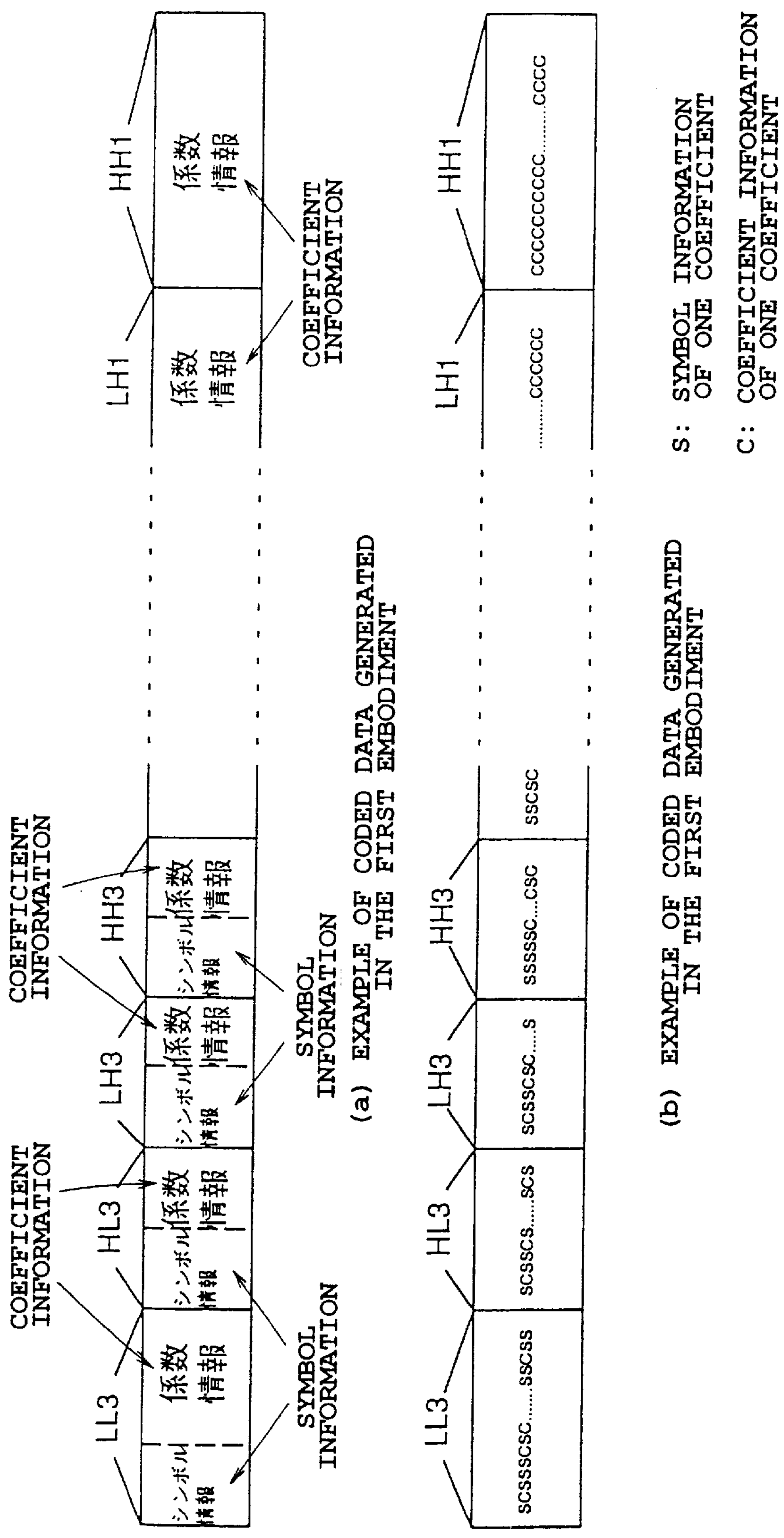
FIG. 4 is a diagram explaining the present invention.

A reference numeral 109 in FIG. 1 denotes a coefficient relocating portion which relocates the coefficient information which is quantized for each block by the prior art for each subband. One block of the blocked subband image which is produced by the prior art in FIG. 18 corresponds to the block in the part (a) of FIG. 3. The portion 109 in FIG. 1 conducts the relocation of the coefficient information from the part (a) to a part (c) of FIG. 3 for each block for producing a new subband image to output it to the memory 111. However, in relation with the coefficients corresponding to SKIP stored in the memory 110, the symbol of the SKIP is written in lieu of the coefficient value as mentioned above and is not coded when coding is conducted.

subband having a frequency which is higher by one level is written into the coded data. Such an operation is repeated until the subband having the highest frequency. The part (b) of FIG. 4 shows another example of the contents of the coded data when the symbol information and coefficient information is collectively arranged for each subband.

In the coded data integrating portion, firstly one set of the symbol information corresponding to one coefficient and one-coefficient information corresponding to this symbol information is written into the coded data and then similarly one set of symbol information of one coefficient and the coding information corresponding thereto is written into the coded data. This operation is repeated until the subband having the highest frequency. Since there is no coefficient information for the coefficients corresponding to ZTR and SKIP at this time, there is no input so that symbol information is successively input. Since no symbol information exists for the subbands having the highest frequency (HL1, LH1, HH1) as mentioned in the description of the prior art, only the coefficient information is coded. The coded data of the symbol information and coefficient information in the part (b) of FIG. 4 will be shown. S denotes symbol information and C denotes coefficient information.

S, C, S, S, C, S, S, S, C, S, C, S, C, S, S, S, C, S . . . , C, C, C, C, C, C, C, C, C, C . . .

← subbands having frequency excepting the highest frequency → ← subband having the highest frequency →

Figure 3:
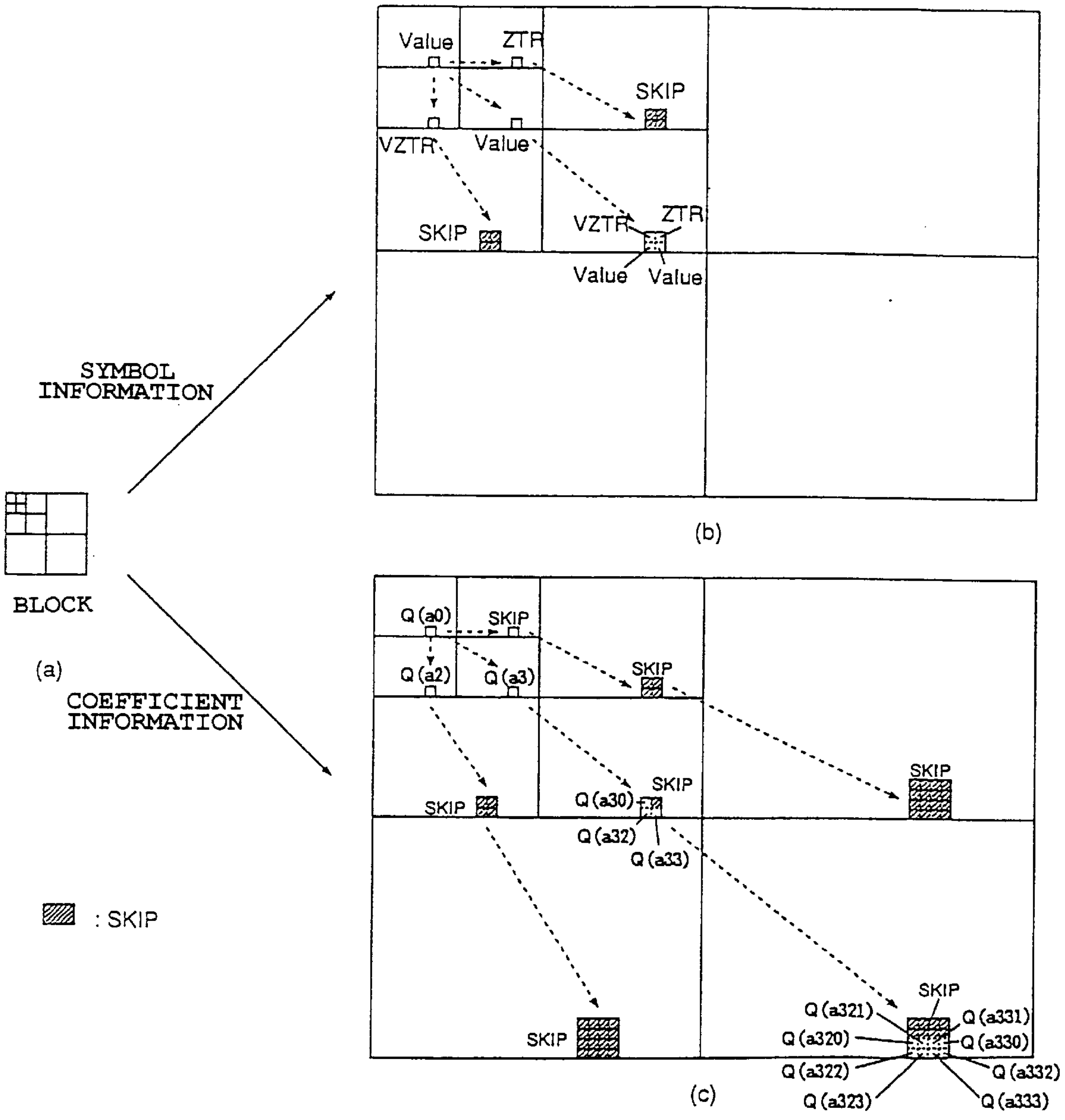
FIG. 3 is a diagram explaining the present invention.

Relocation of the symbols from the part (a) to (b) of FIG. 3 and the relocation of the coefficient values from the part (a) to (c) of FIG. 3 may be conducted by overwriting the relocated symbols and coefficient values into a memory in which the symbols and coefficient values are collected for each block which is shown in FIG. 18 without using the memories 110 and 111 in FIG. 1 and by conducting the subsequent processing by the operation of addresses corresponding to the predetermined positions in memories 110 and 111.

For simplicity of the description, the present embodiment will be described with reference to only the case in which the symbols and coefficient values are written into the memories 110 and 111. Similar processing can be conducted by performing an address calculation in FIG. 18 to reach the block corresponding to the above-mentioned memories 110 and 111.

A reference numeral 107 in FIG. 1 denotes the coded data integrating portion for collectively arranging the symbol information and coefficient information for each subband, which is stored in the memories 110 and 111. The method of integrating the symbol information and coefficient information includes two methods which are shown in a part (a) and (b) of FIG. 4. The part (a) of FIG. 4 shows an example of contents of the coded data when the symbol information and the coefficient information is collectively arranged for each subband.

Figure 6:
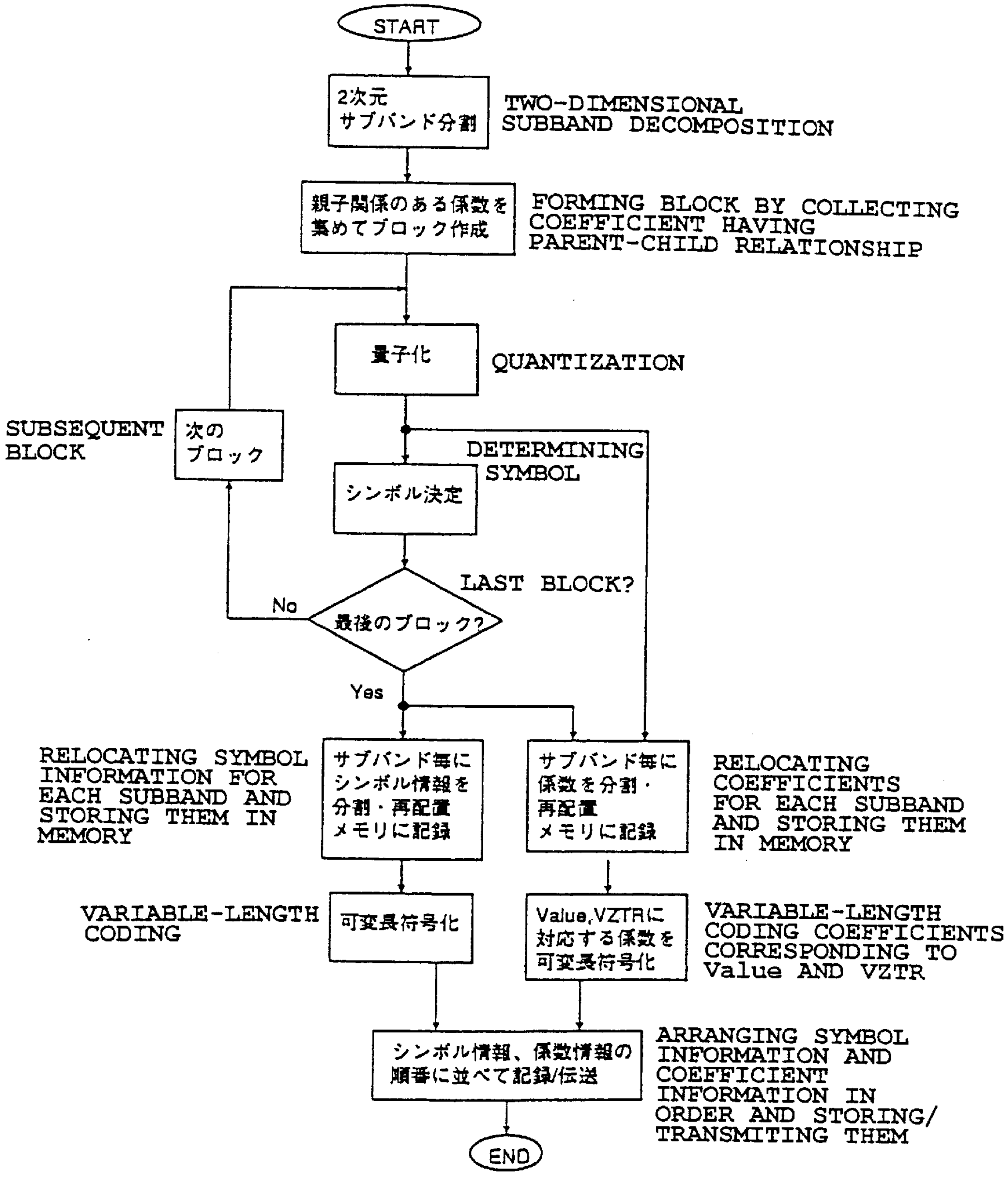
FIG. 6 is a flow chart explaining the operation of the present invention.
Figure 6:
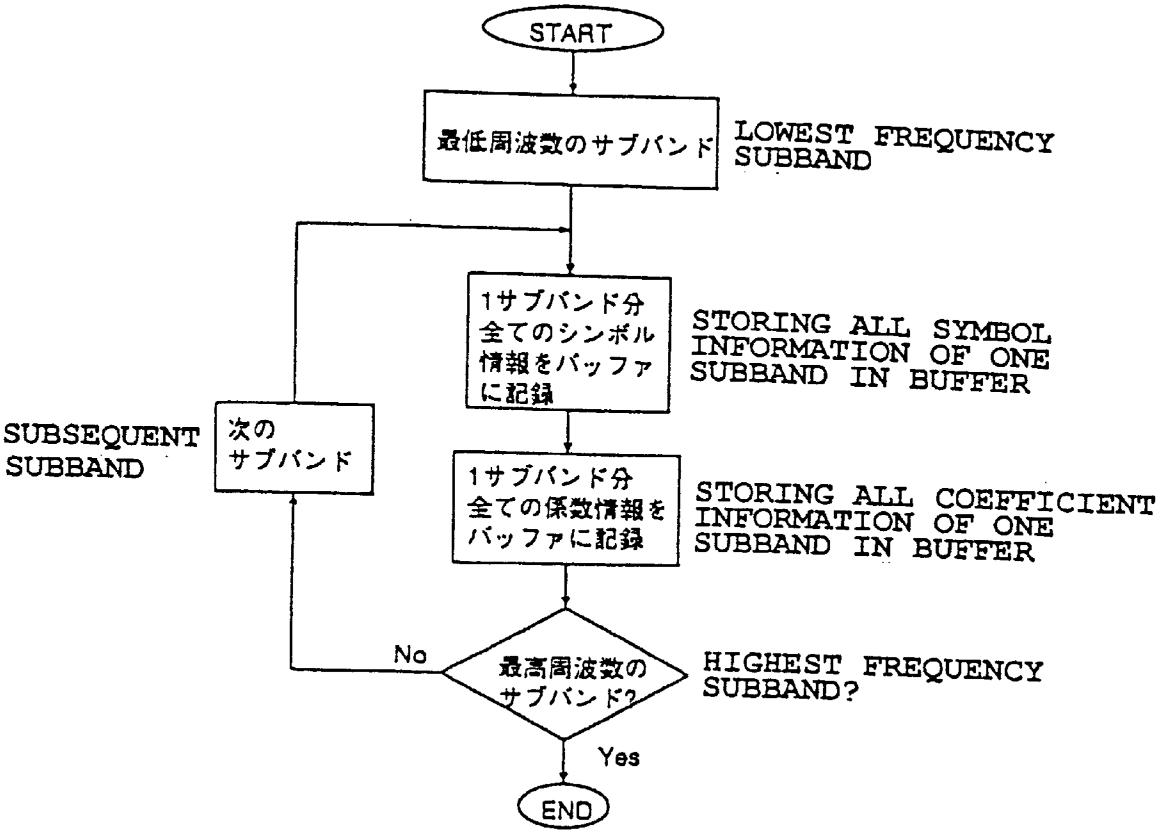
Figure 6:
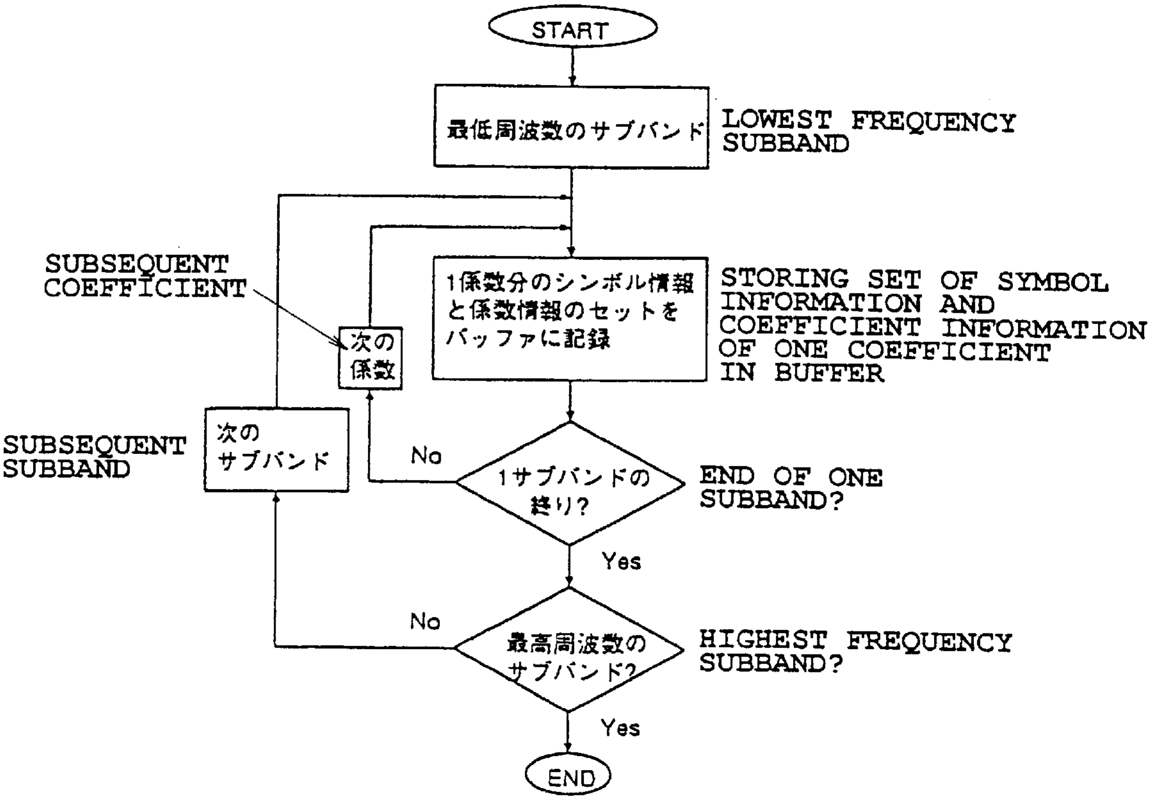

In the coded data integrating portion, the symbol information and coefficient information is consecutively input starting from that in the subband having the lowest frequency to the subband having higher frequency. After the symbol information of one subband is written into the coded data, the coefficient information of one subband is written into the coded data. Then the symbol information of one A part (a) of FIG. 6 is a flow chart showing one example of operation of the image coding device in FIG. 1. A part (b) of FIG. 6 is a flow chart for preparing coded data in the part (a) of FIG. 4. A part (c) of FIG. 6 is a flow chart for preparing coded data in the part (b) of FIG. 4.

As mentioned above, scalability can be provided to the coded data by producing the coded data in order starting from the subband having lower resolution to the subband having higher solution by the relocation of the symbol information and coefficient information in the coding device in the first embodiment of the present invention.

Now, the decoding device will be described.

Figure 2:
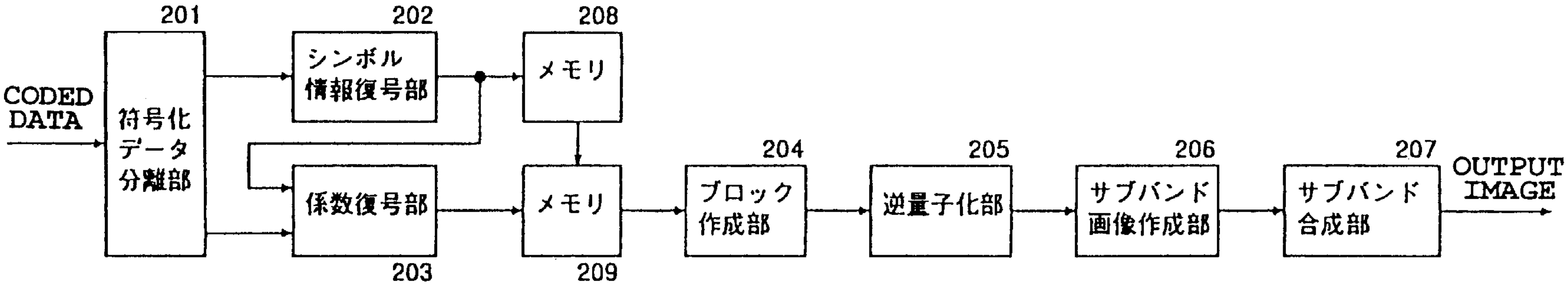
FIG. 2 is a block diagram showing an embodiment of the invention.

FIG. 2 shows a first embodiment of the decoding device of the present invention for decoding the coded data which is prepared by the coding device of the first embodiment of the present invention. Prior to the inverse quantization in the prior art which the coded data is decoded for reproducing the blocked subband images, which are inverse quantized for each block, deblocked them to produce subband images, synthesized to provide a reproduced image, the symbol information and coefficient information is separated and decoded from the coded data and the decoded data is relocated for each subband for producing the whole of subband image and then an additional processing of blocking for inverse quantization is conducted.

A reference numeral 201 in FIG. 2 denotes a coded data separating portion for separating the coded data into the symbol information and coefficient information to output the resultant information into the symbol information decoding portion 202 and the coefficient decoding portion 203. When the coded data of, for example the part (a) of FIG. 4 is input, a boundary between the coded symbol information of one subband and the coded coefficient information of one subband corresponding to the symbol information is detected and the symbol and coefficient information is output to the symbol information decoding portion and coefficient decoding portions, respectively.

Such an operation is repeated for all subbands. When the coded data of, for example the part (b) of FIG. 4 is input, a boundary between the coded one symbol information and the coded coefficient information corresponding to the symbol information is detected and the symbol and coefficient information is output to the symbol information decoding portion and coefficient decoding portions, respectively. Such an operation is repeated for all subbands. However, the symbol information is consecutively input since there is no relevant coefficient information when the symbol is ZTR. A reference numeral 208 denotes a memory for storing therein the symbol information which has been variable-length decoded by the symbol information decoding portion 202 to position corresponding to that on the subband images as shown in the part (b) of FIG. 3.

Since no symbol having a parent-child relationship, which is higher in resolution exists when the symbol of a tree is ZTR or VZTR, SKIP is written in the memory 208 and no symbol is overwritten thereon similarly to the coding device. A reference numeral 209 denotes a memory for storing therein the coefficient information which has been variable-length decoded by the coefficient decoding portion 203 to position corresponding to that on the subband images as shown in the part (c) of FIG. 3. Since no coefficient having a parent-child relationship, which is higher in resolution exists when the symbol of the corresponding tree is ZTR or SKIP, "0" is written in the memory 209 and no coefficient value is overwritten thereon similarly to the coding device.

However, the operation in the decoding device is different from that in the coding device only in that "0" is written in the memory in lieu of "SKIP" in the coding device. The coefficient having a parent-child relationship between the subbands are collected by the block forming portion 204 and based upon the coefficients stored in the memory 209 for forming blocks which are shown in the part (a) of FIG. 3. Thereafter, as mentioned in the description of the prior art, the quantized coefficients are inverse quantized for each block by the inverse quantizing portion 205 and the coefficient values of all blocks are relocated by the subband image producing portion 206 for deblocking to produce the whole of the subband images. A reproduced image can be obtained by synthesizing the subbands by the subband synthesizing portion 207 using a two dimensional synthesizing filter.

Figure 7:
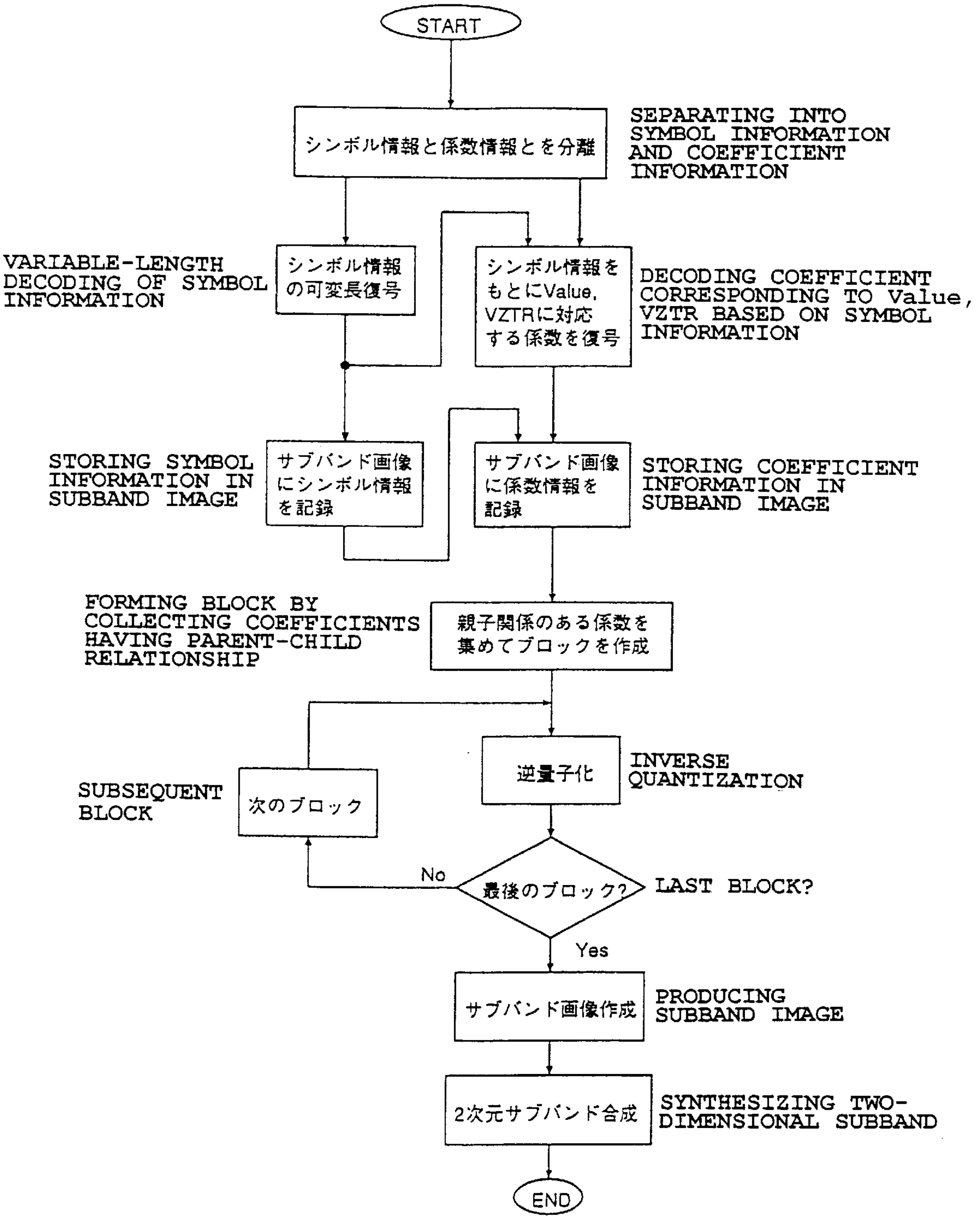
FIG. 7 is a flow chart explaining the operation of the present invention.
Figure 15:
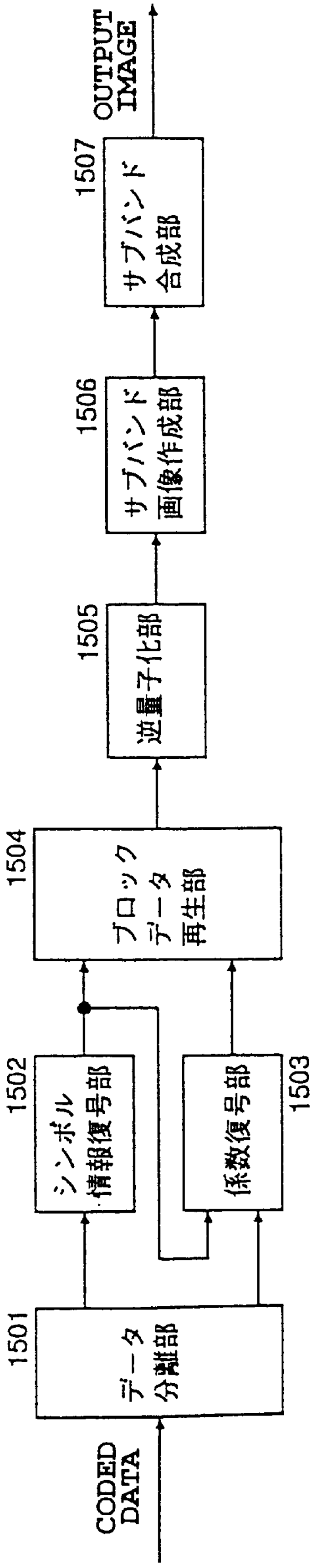
FIG. 15 is a block diagram showing the prior art.
Figure 16:
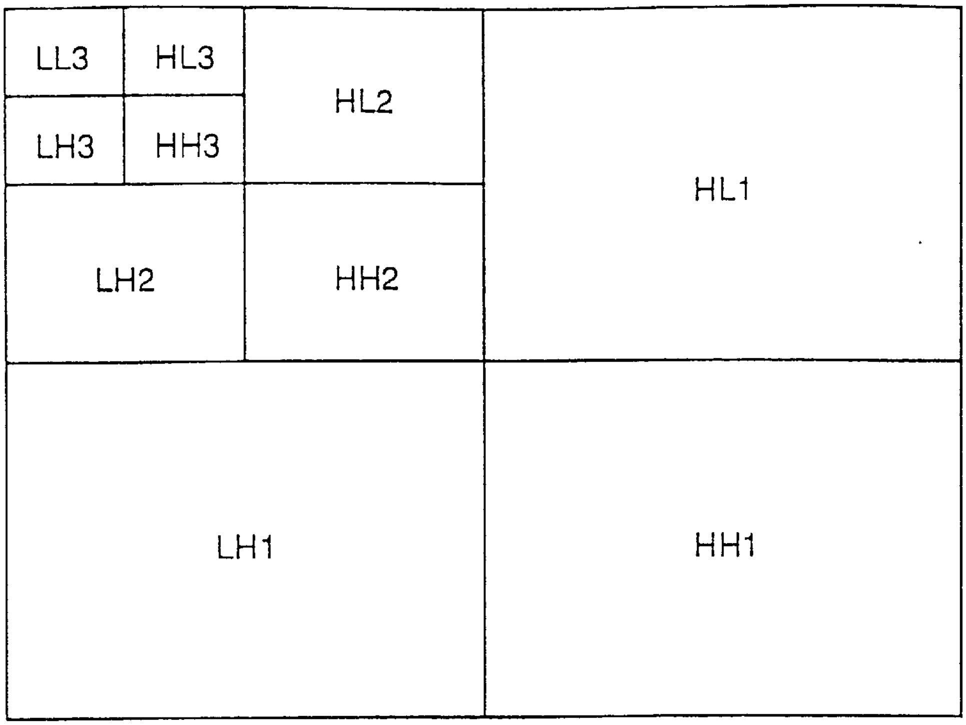
FIG. 16 is a diagram explaining the prior art.
Figure 17:
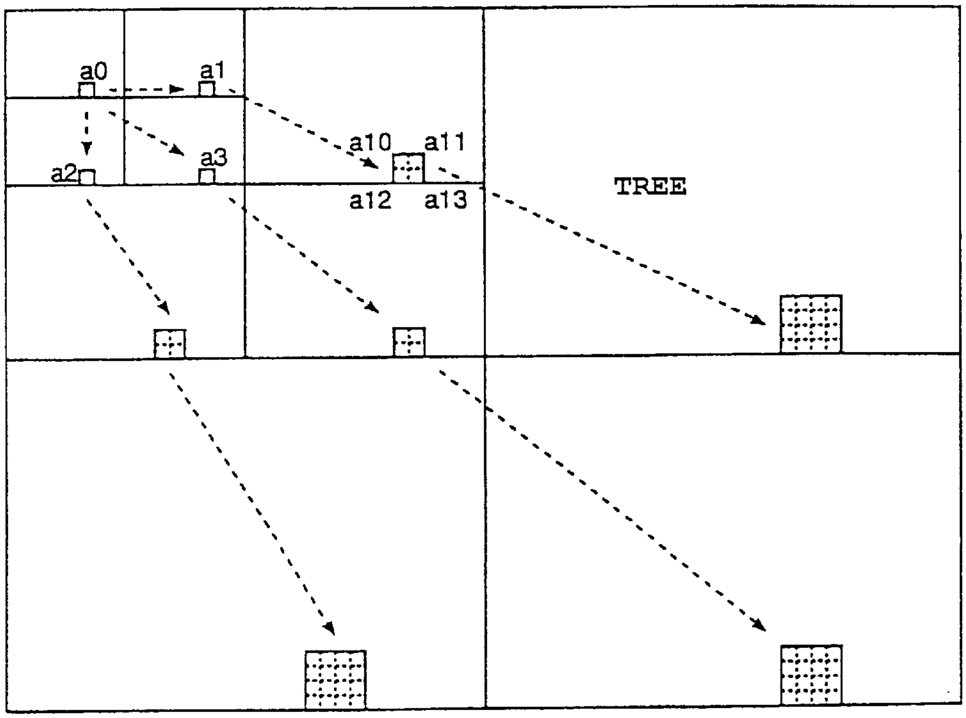
FIG. 17 is a diagram explaining the prior art.

The symbol information decoding portion 202, coefficient decoding portion 203, inverse quantizing portion 205, subband image producing portion 206, subband synthesizing portion 207 and the block forming portion 204 are identical in structure with the portions 1502, 1503, 1505, 1506, 1507 which are shown in FIG. 15 and the portion 104 shown in FIG. 1, respectively. A flow chart showing a series of operations is shown in FIG. 7.

As mentioned above, the coded data having scalability can be decoded in the decoding device of the first embodiment of the present invention.

Figure 10:
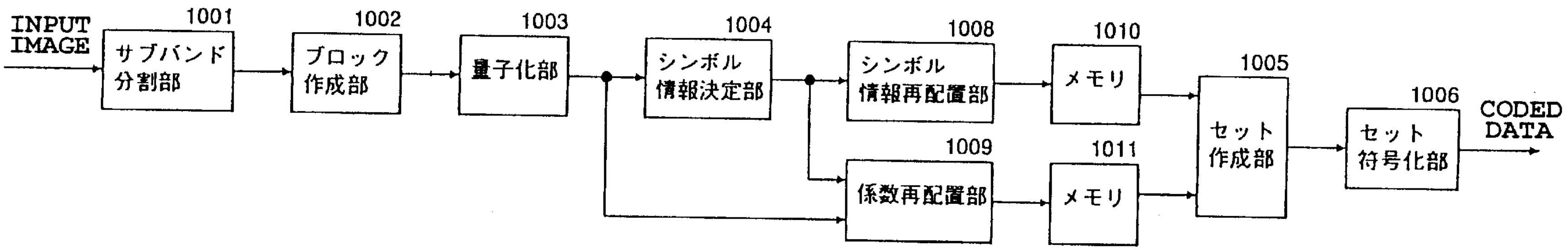
FIG. 10 is a block diagram showing an embodiment of the present invention.

FIG. 10 shows another example in which the coding device of the first embodiment of the present invention is implemented. The difference between the devices which are shown in FIGS. 10 and 1 resides in that a set forming portion 1005 and a set coding portion 1006 are incorporated in lieu of the symbol information coding portion 105, coefficient coding portion 106 and coded data integrating portion 107. Although the symbol information and the coefficient information is independently variable-length coded and arranged in the above-mentioned coding device of the first embodiment, the symbol information and coefficient information is variable-length coded after the set of the symbol and coefficient information in the present example has been formed.

A set of one item of symbol information and coefficient information corresponding to this symbol information is prepared by the set forming portion 1005. Since no symbol information exist in the subbands having the highest frequency (HL1, LH1, HH1), the coefficient information is treated one item by one item. If only symbol information exists in the subbands having a frequency excepting the highest frequency and no corresponding coefficient information exists (ZTR), only symbol information is treated. Now, an example of sets of symbol information and coefficient information is shown. S denotes the symbol information, C denotes coefficient information, parentheses denote sets.

(S, C) (S, C) (S) (S, C) (S) (S, C) (S) (S) (S, C) . . . (C) (C) (C) (C) (C) (C) (C) . . .

← subbands having frequency other than the highest frequency → ← subband having the highest frequency →

Figure 12:
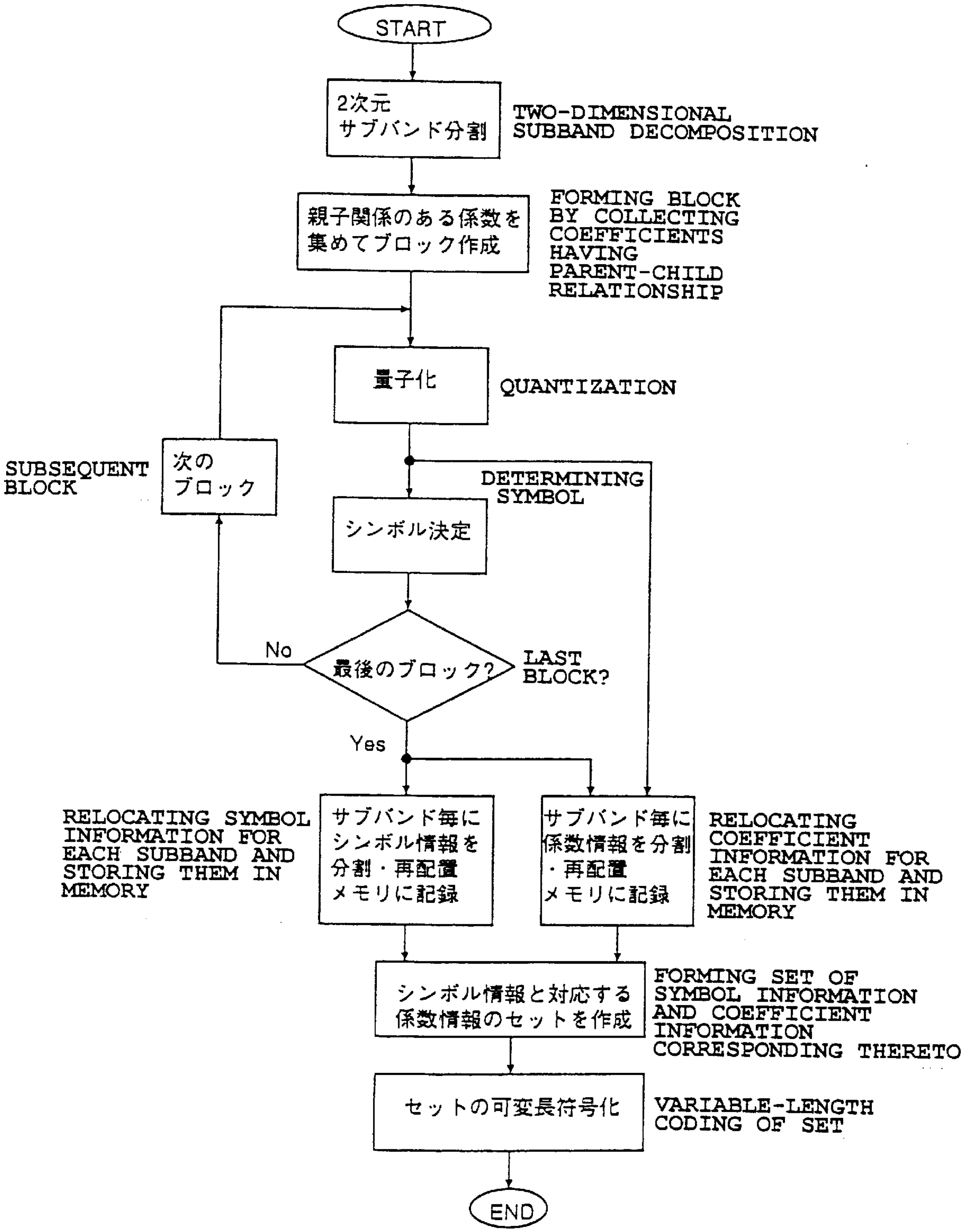
FIG. 12 is a flow chart explaining the operation of the present invention.

The set coding portion 1006 is adapted to variable-length codes the sets of symbol information and coefficient information which are formed by the set forming portion 1005. The specific variable-length coding method may include two-dimensional Huffman coding of the symbol information and the coefficient information, variable-length coding in which the same symbols are consecutive if only symbol information is consecutive and one-dimensional Huffman coding if only coefficients are consecutive. A flow chart of a series of operations is shown in FIG. 12.

As mentioned above, the symbol information and coefficient information are relocated in another coding device of the first embodiment of the present invention. Accordingly, it can be formed the coded data to have the scalability by forming from lower resolution subbands to higher resolution subbands in order.

Figure 11:
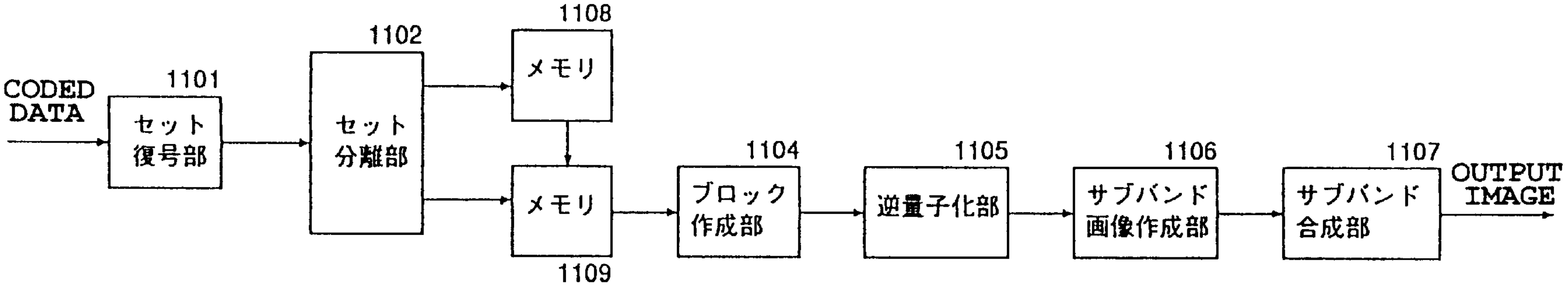
FIG. 11 is a block diagram showing an embodiment of the present invention.

FIG. 11 shows another example in which the decoding device of the first embodiment of the present invention is implemented.

The differences between the devices which are shown in FIGS. 11 and 2 reside in that a set decoding portion 1101 and a set separating portion 1102 are incorporated in lieu of the coded data separating portion 201, the symbol information decoding portion 202, and coefficient decoding portion 203. Although the symbol information and the coefficient information which has been independently coded is variable-length coded after the separation thereof in the decoding device of the above-mentioned embodiment, the set of the symbol information and coefficient information is variable-length coded and thereafter is separated into the symbol information and coefficient information in the present case.

Figure 13:
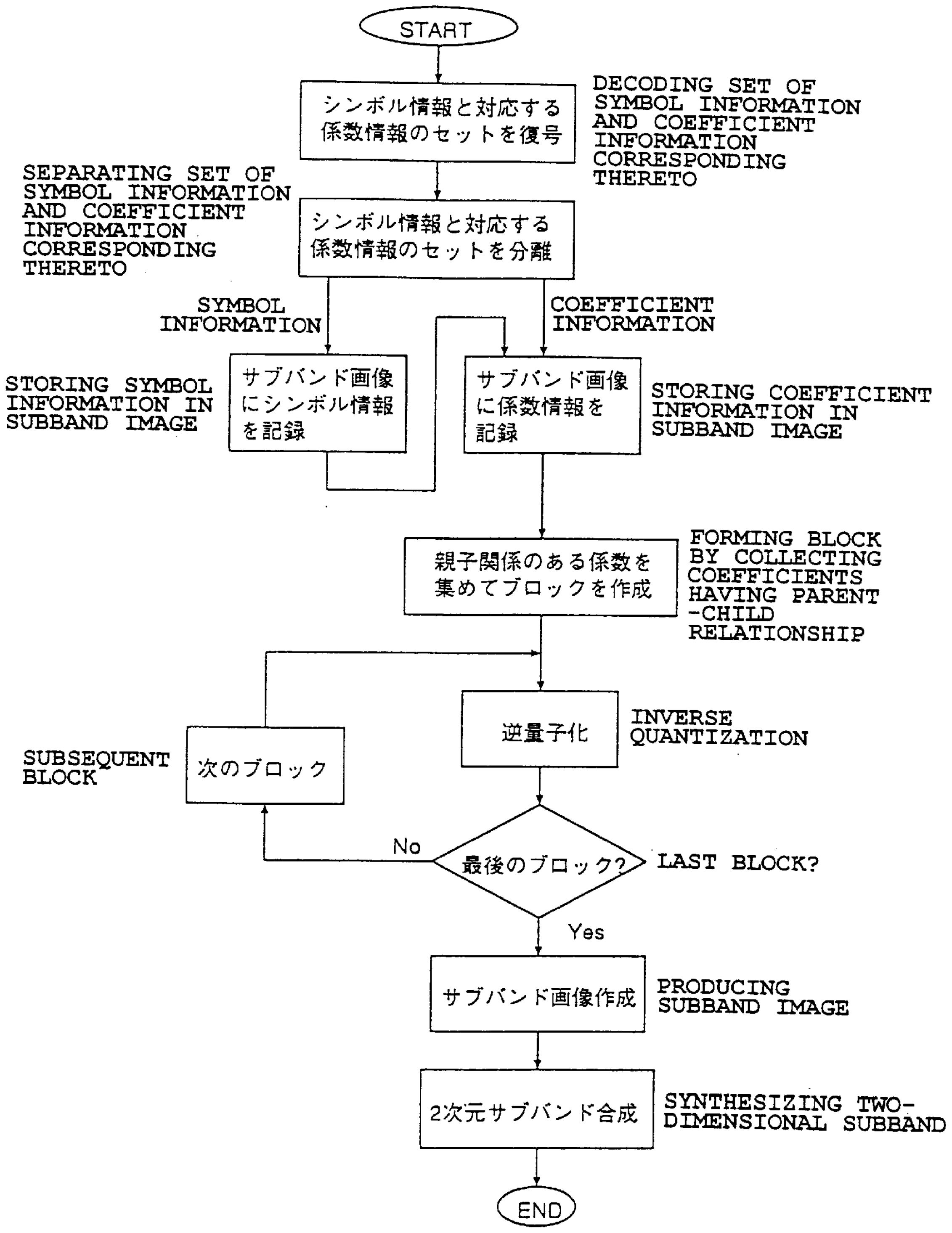
FIG. 13 is a flow chart explaining the operation of the present invention.

In the set decoding portion 1101, coded data in which the set of the symbol information and the coefficient information which is variable-length coded by the coding device shown in FIG. 10 is variable-length decoded. Since no symbol information exists in the subbands having the highest frequency (HL1, LH1, HH1) similarly to the description of the coding in this case, only the coefficient information is decoded. The set of the symbol information and the coefficient information which has been decoded in the set decoding portion 1101 is separated into the symbol information and coefficient information by the set separating portion 1102 so that it is output to the memories 1108 and 1109. A flow chart showing a series of these operations is shown in FIG. 13.

As mentioned above, coded data having scalability can be decoded by another decoding device of the first embodiment of the present invention.

Figure 8:
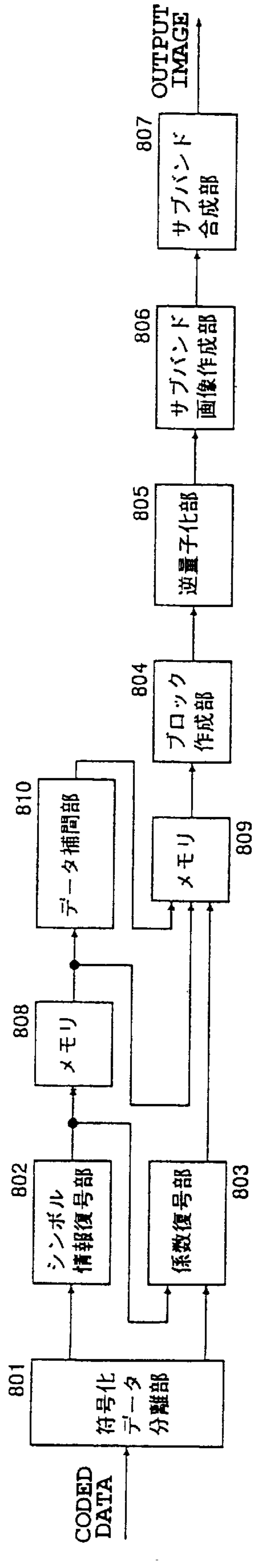
FIG. 8 is a block diagram showing an embodiment of the present invention.

FIG. 8 shows a second embodiment of the decoding device of the present invention. Coding device is identical with that of the first embodiment.

The differences between the devices shown in FIGS. 8 and 2 reside in that a data interpolating portion 810 is added in the device shown in FIG. 8. If the coded data which has been prepared by image coding device is not completely input to the image decoding device or if all the coded data which has been transmitted can not decoded due to low processing speed of the image decoding device, the last half of the coded data may not be input to the image decoding device.

Figure 5:
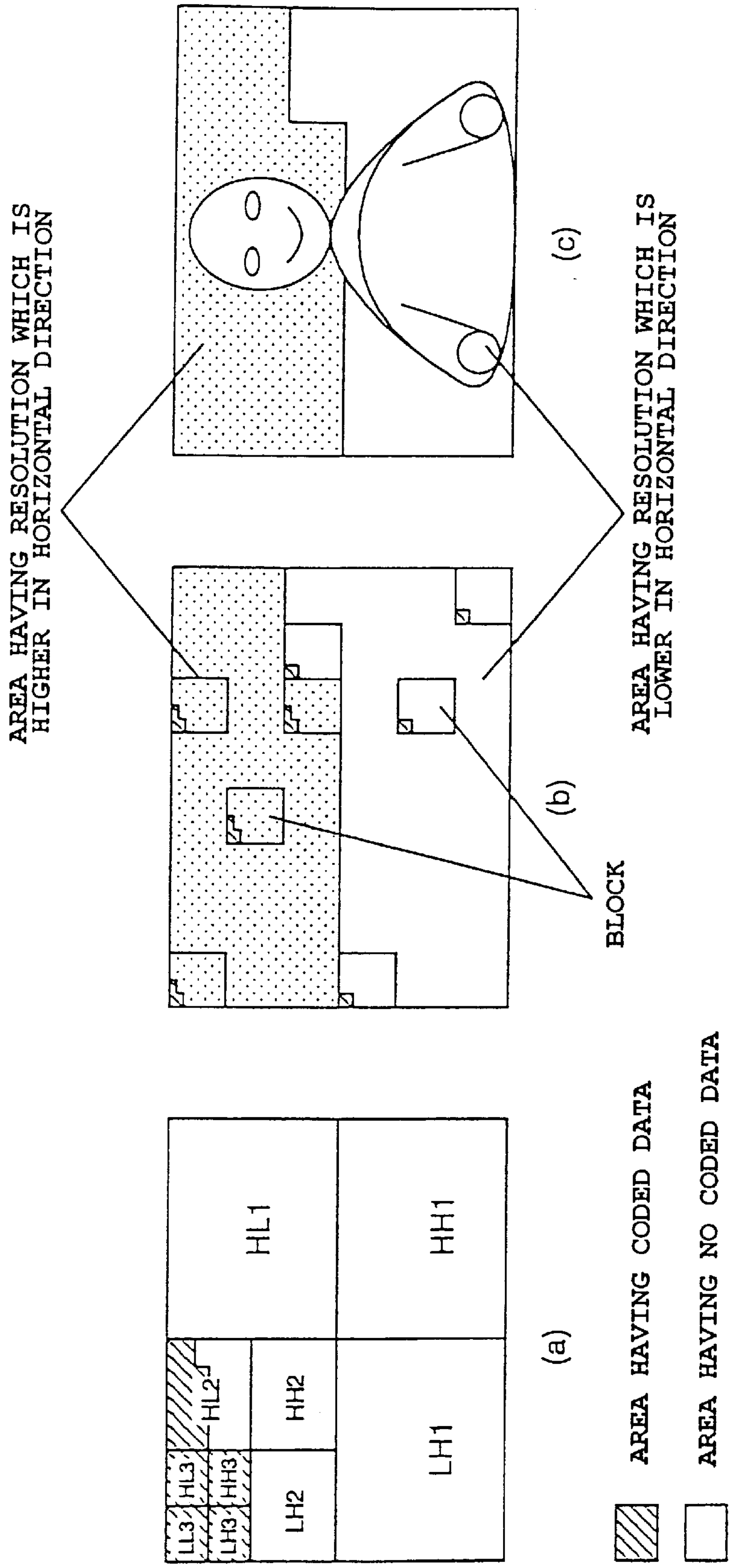
FIG. 5 is a diagram explaining the present invention.

FIG. 5 shows the contents of the memories 808 and 809 in FIG. 8 when the leading portion of the coded data having scalability which is input to the image decoding device. Since the coded data which has been prepared by the image coding device of the first embodiment has the hierarchical structure from the information of the subbands having lower frequency to the information of the subbands having higher frequency, the symbol information and the coefficient information which has been decoded from the discontinued coded data exists as represented by hatched area in a part (a) of FIG. 5.

In the part (a) of FIG. 5, blanks denote the coefficients in which the information on the coded data does not exist so that the information can not be decoded. The data interpolating portion 810 in FIG. 8 substitutes the coefficients of the blanks in the part (a) of FIG. 5 for "0" to interpolate all coefficients of the subband image. Since data on only part of the HL2 in the second hierarchical level of the subband exists in this case, the reproduced image area corresponding to this part has a higher resolution in a horizontal direction.

Since all the coefficients of the subband images are collected by the data interpolating portion 810, blocking can be achieved as shown in a part (b) of FIG. 5 by the block forming portion 804 in FIG. 8. Alternatively, interpolation can be conducted for the coefficient information by the data interpolating portion 810 after the stage of the coefficient decoding portion 803.

The part (a) of FIG. 5 shows a case the coded data is discontinued in the course of the subband HL2. In the part (b) of FIG. 5, half-toned upper half area is an area having a relatively higher resolution in which coded data up to LL3, HL3, LH3, HH3 and HL2 exists in each block when blocking is conducted while lower half area is an area having a relatively lower resolution in which coded data up to LL3, HL3, LH3 and HH3 exists in each block when blocking is conducted.

Figure 9:
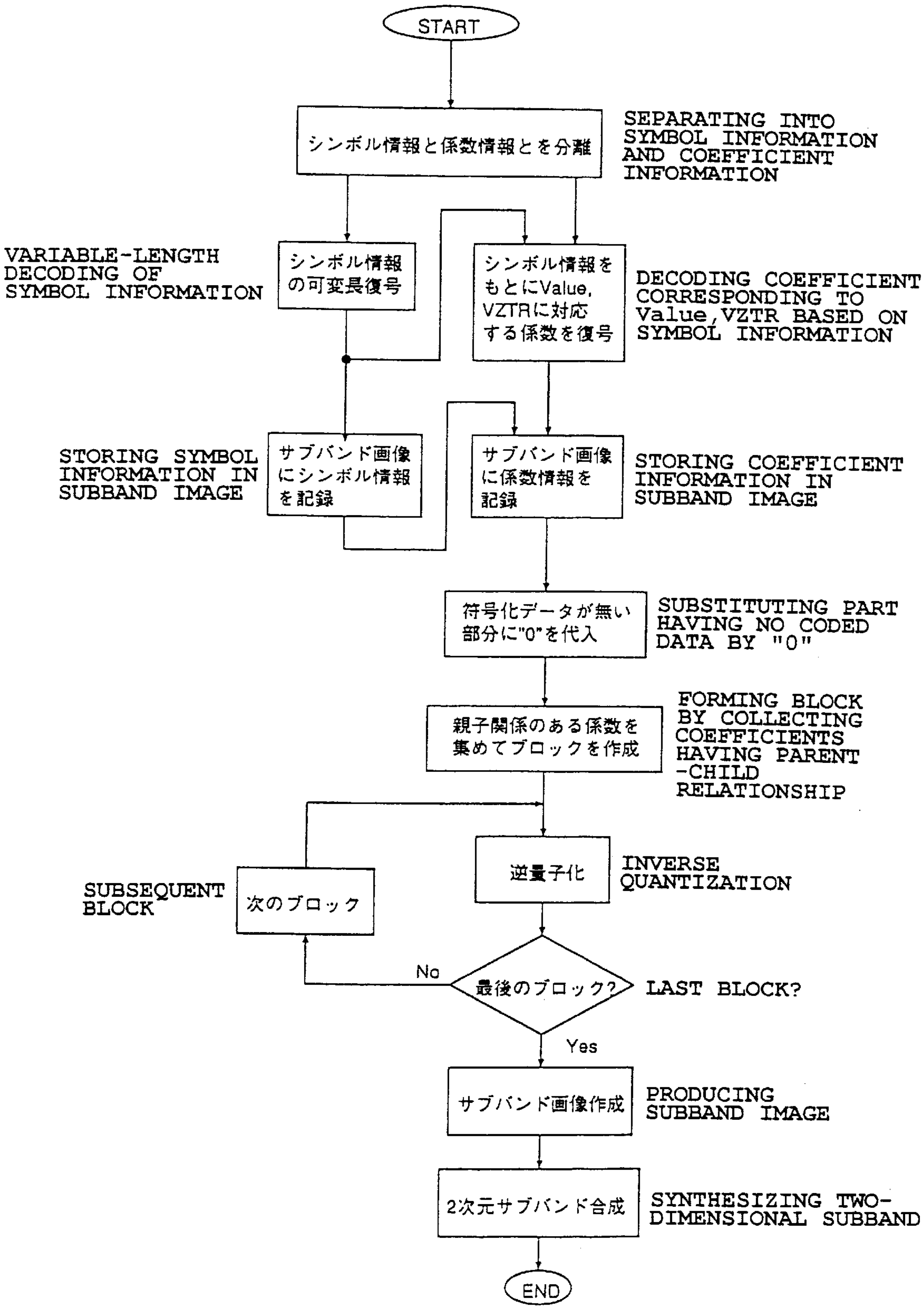
FIG. 9 is a flow chart explaining the operation of the present invention.

The subsequent operation can be proceeded as is similarly to the decoding device of the above-mentioned first embodiment. A reproduced image when only part of the coded data is decoded in such a manner is shown in a part (c) of FIG. 5. The part (c) of FIG. 5 is relevant to the part (a) of FIG. 5. Images having higher resolution can be obtained in upper half of the screen while images having a resolution which is one level lower in a vertical direction than that of upper half screen is obtained in the lower half of the screen. A flow chart showing a series of the operations is shown in FIG. 9.

As mentioned above, the whole of the image can be decoded from part of the coded data having scalability by the decoding device of the second embodiment of the present invention. Coded data having a desired quantity of data can be reproduced substantially consecutively from the leading portion of the coded data when only part of the coded data is decoded. In other words, an image can be reproduce even if decoding is terminated in a desired position of the coded data.

As mentioned above, the reproduced image of the whole image can be obtained from part of the coded data by providing the coded data with scalability in accordance with the present invention.

INDUSTRIAL UTILITY (1) The image coding device of the present invention is capable of implementing of the scalability of the coded data, which has been impossible, while conducting conventional quantization in the block basis by the relocation of the information in the subband basis for preparing coded data after conducting subband decomposition of the image and performing coding process in the block basis.

(2) Since the image coding device of the present invention can achieve quantization in the block basis to control of bit assignment for each block so that high quality of image can be achieved.

(3) Since the coded data has scalability in accordance with the present invention, the whole of the image can be reproduced from part of the coded data having scalability in the image decoding device.

(4) Since the coded data has scalability in accordance with the present invent ion, the quantity of data to be decoded can be specified to a desired number of bits in the image decoding device when only part of the coded data is decoded.

What is claimed is:

1. An image coding device comprising:

a subband decomposing portion for decomposing an image into subbands to produce a first subband image;

a block forming portion for forming a blocked second subband image by collecting subband coefficients having a parent-child relationship between subbands in said first subband image to form a plurality of blocks;

a quantizing portion for quantizing said subband coefficients of each block of said second subband image;

a symbol information determining portion for determining symbol information representing whether the quantized subband coefficient of said second subband image is "0" or non "0";

a symbol information relocating portion for relocating the symbol information of said second subband image in accordance with a frequency position in said first subband image;

a symbol information coding portion for performing variable-length coding of relocated symbol information and generating coded symbol information;

a coefficient relocating portion for relocating said quantized subband coefficients to be coded based upon said symbol information and forming a third subband image in accordance with the frequency position in said first subband image;

a coefficient coding portion for performing variable-length coding of said relocated quantized subband coefficients and generating coded quantized subband coefficients; and a coded data integrating portion for collecting and arranging said coded symbol information and said coded quantized subband coefficients in order of resolution level, whereby the coded data is provided with a hierarchical structure.

2. An image coding device as defined in claim 1, wherein said coded data integrating portion collects and arranges symbol information and subband co-efficients with symbol information being arranged before subband coefficients, and with the subbands being arranged from relatively lower resolution to relatively higher resolution.

3. An image coding device as defined in claim 1, wherein said coded data integrating portion forms sets of a symbol information and a subband coefficient corresponding thereto for subbands which are arranged from relatively lower resolution to relatively higher resolution.

4. An image decoding device for decoding coded data having a hierarchical structure comprising:

a coded data separating portion for separating inputted coded data into symbol information and subband coefficients, said inputted coded data having symbol information representing whether a corresponding quantized subband coefficient is “0” or non “0” and a subband coefficient, wherein symbol information and subband coefficients are arranged in order of resolution level;

a symbol information decoding portion for decoding separated symbol information;

a coefficient decoding portion for reproducing a third subband image by decoding each of said subband coefficient based upon said decoded symbol information;

a block forming portion for forming a blocked second subband image comprising a plurality of blocks which are formed by collecting said decoded subband coefficients having a parent-child relationship between subbands;

an inverse quantizing portion for inversely quantizing said decoded subband coefficients of said second subband image;

a subband image producing portion for producing first subband images which are relocated in accordance with the frequency position in a third subband coefficient by deblocking said inverse quantized subband coefficients of said second subband image; and a subband synthesizing portion for synthesizing said subband images to provide a decoded image.

5. An image decoding device as defined in claim 4, wherein said coded data separating portion separates the coded data into collected symbol information and then into subband coefficients for subbands wherein the subbands in the coded data are arranged from relatively lower resolution to relatively higher resolution.

6. An image decoding device as defined in claim 4, wherein said coded data separating portion separates the coded data into a symbol information for each symbol and a subband coefficient corresponding to the symbol information, and the coded data includes subbands arranged from relatively lower resolution to relatively higher resolution.

7. An image decoding device as defined in claim 4, further comprising:

a data interpolating portion for inserting “0” into a value of subband coefficient which can not be decoded if only part of coded data which is produced by said image coding device is inputted, whereby a reproduced image is obtained by decoding only part of coded data having a hierarchical structure.

8. An image coding device comprising:

a subband decomposing portion for decomposing an image into subbands to produce a first subband image;

a block forming portion for forming a blocked second subband image by collecting subband coefficients having a parent-child relationship between subbands in said first subband image to form a plurality of blocks;

a quantizing portion for quantizing said subband coefficients in each block of said second subband image;

a symbol information determining portion for determining symbol information representing whether the quantized subband coefficient of said second subband image is “0” or non “0”;

a symbol information relocating portion for relocating the symbol information of said second subband image in accordance with the frequency position in said first subband image;

a coefficient relocating portion for relocating said quantized subband coefficients to be coded based upon said symbol information and forming a third subband image in accordance with the frequency position in said first subband image;

a set forming portion for forming a set of said symbol information and subband coefficient corresponding to said symbol information, with a plurality of sets being arranged in order of resolution level; and a set coding portion for performing variable-length coding of said set of said symbol information and subband coefficient, whereby the coded data is provided with a hierarchical structure.

9. An image decoding device for decoding coded data having a hierarchical structure, comprising:

a set decoding portion for decoding a set of a symbol information and subband coefficient in inputted coded data having a set of a symbol information representing whether a quantized subband coefficient is “0” or non “0” and a subband coefficient, where a plurality of sets are arranged in order of resolution level;

a set separating portion for separating said decoded set into symbol information and subband coefficient to reproduce a third subband image;

a block forming portion for forming a second blocked subband image including a plurality of blocks which are formed by collecting said decoded subband coefficients having a parent-child relationship between subbands;

an inverse quantizing portion for inversely quantizing said decoded subband coefficients of said second subband image;

a subband image producing portion for producing first subband images which are relocated in accordance with a frequency position in a third subband coefficient by deblocking said inverse quantized subband coefficients of said second subband image; and a subband synthesizing portion for synthesizing said subband images to provide a decoded image.

* * * * *